(12) United States Patent
Reynolds et al.

(10) Patent No.: US 7,814,421 B2
(45) Date of Patent: Oct. 12, 2010

(54) PROGRAM GUIDE SYSTEM WITH VIDEO WINDOW BROWSING

(75) Inventors: Steven J Reynolds, Littleton, CO (US); David M Rudnick, Denver, CO (US); Joel G Hassell, Arvada, CO (US); Michael D Ellis, Boulder, CO (US)

(73) Assignee: United Video Properties, Inc., Tulsa, OK (US)

( * ) Notice: Subject to any disclaimer, the term of this patent is extended or adjusted under 35 U.S.C. 154(b) by 1025 days.

(21) Appl. No.: 10/359,493

(22) Filed: Feb. 4, 2003

(65) Prior Publication Data

US 2003/0117430 A1    Jun. 26, 2003

Related U.S. Application Data

(63) Continuation of application No. 09/262,670, filed on Mar. 4, 1999, now Pat. No. 6,563,515.

(60) Provisional application No. 60/086,051, filed on May 19, 1998.

(51) Int. Cl.
*G06F 3/00* (2006.01)
*G06F 13/00* (2006.01)
*H04N 5/445* (2006.01)

(52) U.S. Cl. .................. 715/716; 715/719; 715/721; 725/39; 725/40; 725/41; 348/563; 348/564; 348/565

(58) Field of Classification Search ............. 715/716, 715/719, 721; 725/39–49; 348/563–565
See application file for complete search history.

(56) References Cited

U.S. PATENT DOCUMENTS 3,492,577 A    1/1970    Reiter et al
3,493,674 A    2/1970    Houghton
3,833,757 A    9/1974    Kirk, Jr. et al
3,891,792 A    6/1975    Kimura
3,936,868 A    2/1976    Thorpe (Continued)

FOREIGN PATENT DOCUMENTS

| DE | 29 18846  | 11/1980 |
| DE | 32 46 225 | 6/1984  |
| DE | 3337204   | 4/1985  |
| DE | 3621263   | 1/1988  |
| EP | 0 337 336 | 10/1989 |

(Continued)

OTHER PUBLICATIONS

"Addressable Converters: A New Development at CableData," Via Cable, vol. 1, No. 12 (Dec. 1981).

(Continued)

*Primary Examiner*—Tadeese Hailu
(74) *Attorney, Agent, or Firm*—Ropes & Gray LLP

(57) ABSTRACT

An interactive television program guide system is provided in which a viewer may direct a television to simultaneously display a selected television program, a program guide display, and a program guide video window. A viewer may use the program guide video window to browse video of programs shown on the program guide display while continuing to view a previously selected program in the background. The program guide display may display video on demand (VOD) programs, programs to be broadcast in the future, and programs currently being broadcast on other channels. The viewer may browse through programs on the program guide display using a variety of keys on a remote control unit. The viewer may direct the program guide to swap audio and video signals back and forth between programs shown in the video window and programs shown on the background screen.

35 Claims, 14 Drawing Sheets

U.S. PATENT DOCUMENTS

| | | |
|---|---|---|
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,261,006 A | 4/1981 | Weintraub et al. |
| 4,264,924 A | 4/1981 | Freeman |
| 4,270,145 A | 5/1981 | Farina |
| 4,283,787 A | 8/1981 | Chambers |
| 4,288,809 A | 9/1981 | Yabe |
| 4,305,101 A | 12/1981 | Yarbrough et al. |
| 4,329,684 A | 5/1982 | Monteath et al. |
| 4,337,480 A | 6/1982 | Bourassin et al. |
| 4,337,483 A | 6/1982 | Guillou |
| 4,344,090 A | 8/1982 | Belisomi et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,581 A | 1/1984 | Schweppe et al. |
| 4,429,385 A | 1/1984 | Cichelli et al. |
| 4,449,249 A | 5/1984 | Price |
| 4,456,925 A | 6/1984 | Skerlos et al. |
| 4,477,830 A | 10/1984 | Lindman et al. |
| 4,488,179 A | 12/1984 | Krüger et al. |
| 4,495,654 A | 1/1985 | Deiss |
| 4,496,171 A | 1/1985 | Cherry |
| 4,496,804 A | 1/1985 | Hung |
| 4,496,976 A | 1/1985 | Swanson et al. |
| 4,510,623 A | 4/1985 | Bonneau et al. |
| 4,536,791 A | 8/1985 | Campbell et al. |
| 4,547,804 A | 10/1985 | Greenberg |
| 4,566,034 A | 1/1986 | Harger et al. |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,620,229 A | 10/1986 | Amano et al. |
| 4,635,121 A | 1/1987 | Hoffman et al. |
| 4,641,205 A | 2/1987 | Beyers, Jr. |
| 4,677,466 A | 6/1987 | Lert, Jr. et al. |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,706,121 A | 11/1987 | Young |
| 4,712,105 A | 12/1987 | Kohler |
| 4,729,027 A | 3/1988 | Hakamada et al. |
| 4,734,769 A | 3/1988 | Davis |
| 4,746,983 A | 5/1988 | Hakamada |
| 4,751,578 A | 6/1988 | Reiter et al. |
| 4,754,326 A | 6/1988 | Kram et al. |
| 4,768,228 A | 8/1988 | Clupper et al. |
| 4,775,935 A | 10/1988 | Yourick |
| 4,787,063 A | 11/1988 | Muguet |
| 4,821,102 A | 4/1989 | Ichikawa et al. |
| 4,862,268 A | 8/1989 | Campbell et al. |
| 4,873,584 A | 10/1989 | Hashimoto |
| 4,890,168 A | 12/1989 | Inoue et al. |
| 4,890,321 A | 12/1989 | Seth-Smith et al. |
| 4,894,789 A | 1/1990 | Yee |
| 4,908,707 A | 3/1990 | Kinghorn |
| 4,908,713 A | 3/1990 | Levine |
| 4,918,531 A | 4/1990 | Johnson |
| 4,954,882 A | 9/1990 | Kamemoto |
| 4,959,720 A | 9/1990 | Duffield et al. |
| 4,963,994 A | 10/1990 | Levine |
| 4,977,455 A | 12/1990 | Young |
| 4,991,011 A | 2/1991 | Johnson et al. |
| 4,991,012 A | 2/1991 | Yoshino |
| 4,992,782 A | 2/1991 | Sakamoto et al. |
| 4,998,171 A | 3/1991 | Kim et al. |
| 5,027,400 A | 6/1991 | Baji et al. |
| 5,031,045 A | 7/1991 | Kawasaki |
| 5,038,211 A | 8/1991 | Hallenbeck |
| 5,040,067 A | 8/1991 | Yamazaki |
| 5,045,947 A | 9/1991 | Beery |
| 5,047,867 A | 9/1991 | Strubbe et al. |
| 5,068,734 A | 11/1991 | Beery |
| 5,072,412 A | 12/1991 | Henderson, Jr. et al. |
| 5,083,205 A | 1/1992 | Arai |
| 5,103,314 A | 4/1992 | Keenan |
| 5,109,279 A | 4/1992 | Ando |
| 5,146,335 A | 9/1992 | Kim et al. |
| 5,148,275 A | 9/1992 | Blatter et al. |
| 5,151,789 A | 9/1992 | Young |
| 5,161,019 A | 11/1992 | Emanuel |
| 5,210,611 A | 5/1993 | Yee et al. |
| 5,214,622 A | 5/1993 | Nemoto et al. |
| 5,220,420 A | 6/1993 | Hoarty et al. |
| 5,223,924 A | 6/1993 | Strubbe |
| 5,231,493 A | 7/1993 | Apitz |
| 5,233,423 A | 8/1993 | Jernigan et al. |
| 5,235,415 A | 8/1993 | Bonicel et al. |
| 5,237,411 A | 8/1993 | Fink et al. |
| 5,237,417 A | 8/1993 | Hayashi et al. |
| 5,237,418 A | 8/1993 | Kaneko |
| 5,247,364 A | 9/1993 | Banker et al. |
| 5,253,066 A | 10/1993 | Vogel |
| 5,285,265 A | 2/1994 | Choi |
| 5,299,006 A | 3/1994 | Kim |
| 5,311,423 A | 5/1994 | Clark |
| 5,315,392 A | 5/1994 | Ishikawa et al. |
| 5,335,277 A | 8/1994 | Harvey et al. |
| 5,353,121 A | 10/1994 | Young et al. |
| 5,357,276 A | 10/1994 | Banker et al. |
| 5,382,983 A | 1/1995 | Kwoh et al. |
| 5,390,027 A | 2/1995 | Henmi et al. |
| 5,398,074 A * | 3/1995 | Duffield et al. ............. 348/564 |
| 5,404,393 A | 4/1995 | Remillard |
| 5,410,326 A | 4/1995 | Goldstein |
| 5,412,720 A | 5/1995 | Hoarty |
| 5,434,625 A | 7/1995 | Willis |
| 5,453,796 A | 9/1995 | Duffield |
| 5,465,385 A | 11/1995 | Ohga et al. |
| 5,477,262 A | 12/1995 | Banker et al. |
| 5,479,268 A | 12/1995 | Young et al. |
| 5,485,197 A | 1/1996 | Hoarty |
| 5,485,221 A * | 1/1996 | Banker et al. ............... 348/563 |
| 5,502,504 A | 3/1996 | Marshall et al. |

| | | | |
|---|---|---|---|
| 5,523,796 A | 6/1996 | Marshall et al. | |
| 5,528,304 A | 6/1996 | Cherrick et al. | |
| 5,532,754 A | 7/1996 | Young et al. | |
| 5,557,338 A * | 9/1996 | Maze et al. | 725/38 |
| 5,559,548 A | 9/1996 | Davis et al. | |
| 5,559,549 A | 9/1996 | Hendricks et al. | |
| 5,559,550 A | 9/1996 | Mankovitz | |
| 5,583,560 A | 12/1996 | Florin et al. | |
| 5,585,838 A | 12/1996 | Lawler et al. | |
| 5,585,866 A | 12/1996 | Miller et al. | |
| 5,589,892 A | 12/1996 | Knee et al. | |
| 5,592,551 A * | 1/1997 | Lett et al. | 380/211 |
| 5,594,509 A | 1/1997 | Florin et al. | |
| 5,600,364 A | 2/1997 | Hendricks et al. | |
| 5,600,573 A | 2/1997 | Hendricks et al. | |
| 5,610,664 A | 3/1997 | Bobert | |
| 5,619,249 A | 4/1997 | Billock et al. | |
| 5,621,456 A | 4/1997 | Florin et al. | |
| 5,621,579 A | 4/1997 | Yuen | |
| 5,625,406 A | 4/1997 | Newberry et al. | |
| 5,635,978 A | 6/1997 | Alten et al. | |
| 5,642,498 A * | 6/1997 | Kutner | 345/547 |
| 5,659,350 A | 8/1997 | Hendricks et al. | |
| 5,682,195 A | 10/1997 | Hendricks et al. | |
| 5,687,331 A | 11/1997 | Volk et al. | |
| 5,710,601 A | 1/1998 | Marshall et al. | |
| 5,719,637 A * | 2/1998 | Ohkura et al. | 725/56 |
| 5,731,844 A | 3/1998 | Rauch et al. | |
| 5,734,853 A | 3/1998 | Hendricks et al. | |
| 5,740,549 A | 4/1998 | Reilly et al. | |
| 5,752,160 A | 5/1998 | Dunn | |
| 5,754,253 A * | 5/1998 | Lee | 348/565 |
| 5,781,227 A | 7/1998 | Goode et al. | |
| 5,781,246 A | 7/1998 | Alten et al. | |
| 5,790,204 A * | 8/1998 | Yamaguchi | 348/564 |
| 5,793,412 A | 8/1998 | Asamizuya | |
| 5,793,971 A | 8/1998 | Fujita et al. | |
| 5,798,785 A | 8/1998 | Hendricks et al. | |
| 5,805,154 A * | 9/1998 | Brown | 715/717 |
| 5,805,763 A | 9/1998 | Lawler et al. | |
| 5,808,608 A | 9/1998 | Young et al. | |
| 5,815,145 A * | 9/1998 | Matthews, III | 725/41 |
| 5,815,541 A * | 9/1998 | Fukushi | 375/376 |
| 5,830,068 A | 11/1998 | Brenner et al. | |
| 5,838,314 A | 11/1998 | Neel et al. | |
| 5,841,483 A * | 11/1998 | Shafer | 348/565 |
| 5,844,620 A * | 12/1998 | Coleman et al. | 725/54 |
| 5,850,218 A * | 12/1998 | LaJoie et al. | 725/45 |
| 5,867,227 A * | 2/1999 | Yamaguchi | 725/56 |
| 5,900,905 A | 5/1999 | Shoff et al. | |
| 5,900,916 A * | 5/1999 | Pauley | 725/59 |
| 5,907,323 A * | 5/1999 | Lawler et al. | 725/41 |
| 5,956,094 A * | 9/1999 | Chun | 348/564 |
| 5,969,767 A * | 10/1999 | Ishikawa et al. | 348/564 |
| 5,978,046 A * | 11/1999 | Shintani | 348/589 |
| 5,990,927 A | 11/1999 | Hendricks et al. | |
| 6,002,394 A * | 12/1999 | Schein et al. | 725/39 |
| 6,002,444 A | 12/1999 | Marshall et al. | |
| 6,005,597 A * | 12/1999 | Barrett et al. | 725/46 |
| 6,011,594 A * | 1/2000 | Takashima | 348/565 |
| 6,018,372 A | 1/2000 | Etheredge | |
| 6,025,837 A | 2/2000 | Matthews, III et al. | |
| 6,028,599 A | 2/2000 | Yuen et al. | |
| 6,031,580 A * | 2/2000 | Sim | 725/43 |
| 6,064,376 A | 5/2000 | Berezowski et al. | |
| 6,075,575 A | 6/2000 | Schein et al. | |
| 6,097,442 A * | 8/2000 | Rumreich et al. | 348/563 |
| 6,100,936 A * | 8/2000 | Jordan et al. | 348/552 |
| 6,147,715 A | 11/2000 | Yuen et al. | |
| 6,151,059 A | 11/2000 | Schein et al. | |
| 6,172,677 B1 | 1/2001 | Stautner et al. | |
| 6,177,931 B1 * | 1/2001 | Alexander et al. | 725/52 |
| 6,212,680 B1 * | 4/2001 | Tsinberg et al. | 725/39 |
| 6,239,794 B1 | 5/2001 | Yuen et al. | |
| 6,240,555 B1 | 5/2001 | Shoff et al. | |
| 6,263,501 B1 | 7/2001 | Schein et al. | |
| 6,275,268 B1 | 8/2001 | Ellis et al. | |
| 6,323,911 B1 | 11/2001 | Schein et al. | |
| 6,331,877 B1 | 12/2001 | Bennington et al. | |
| 6,357,045 B1 * | 3/2002 | Devaney | 725/138 |
| 6,396,546 B1 | 5/2002 | Alten et al. | |
| 6,397,386 B1 | 5/2002 | O'Connor et al. | |
| 6,418,556 B1 | 7/2002 | Bennington et al. | |
| 6,445,398 B1 * | 9/2002 | Gerba et al. | 715/721 |
| 6,469,753 B1 * | 10/2002 | Klosterman et al. | 348/552 |
| 6,477,705 B1 | 11/2002 | Yuen et al. | |
| 6,538,701 B1 | 3/2003 | Yuen | |
| 6,564,379 B1 * | 5/2003 | Knudson et al. | 725/42 |
| 6,745,391 B1 * | 6/2004 | Macrae et al. | 725/42 |
| 7,047,547 B2 | 5/2006 | Alten et al. | |
| 7,100,185 B2 | 8/2006 | Bennington et al. | |
| 2001/0001160 A1 * | 5/2001 | Shoff et al. | 725/51 |
| 2002/0073424 A1 * | 6/2002 | Ward et al. | 725/42 |
| 2003/0177494 A1 | 9/2003 | Satterfield et al. | |
| 2004/0073920 A1 | 4/2004 | Yuen et al. | |
| 2004/0230992 A1 | 11/2004 | Yuen et al. | |
| 2005/0216936 A1 * | 9/2005 | Knudson et al. | 725/42 |

FOREIGN PATENT DOCUMENTS

| | | |
|---|---|---|
| EP | 0 393 555 | 10/1990 |
| EP | 0 401 930 | 12/1990 |
| EP | 0 408 892 | 1/1991 |
| EP | 444496 | 9/1991 |
| EP | 447968 | 9/1991 |
| EP | 488379 | 6/1992 |
| EP | 497235 | 8/1992 |
| EP | 0 532 322 | 3/1993 |
| EP | 0 624 039 A2 | 11/1994 |
| EP | 0 772 360 A2 | 5/1997 |
| FR | 2662895 | 12/1991 |
| GB | 2034995 | 6/1980 |
| GB | 2126002 | 3/1984 |
| GB | 2185670 | 7/1987 |
| GB | 2217144 | 10/1989 |
| GB | 2256546 | 12/1992 |
| JP | 58-137344 | 8/1983 |
| JP | 58-196738 | 11/1983 |
| JP | 59-141878 | 8/1984 |
| JP | 60-61935 | 4/1985 |
| JP | 61-050470 | 3/1986 |
| JP | 61-074476 | 4/1986 |
| JP | 62-060384 | 3/1987 |
| JP | 03-178278 | 8/1991 |
| JP | 04-044475 | 2/1992 |
| JP | 08251502 * | 8/1996 |
| WO | WO 88/04507 | 6/1988 |
| WO | WO 90/15507 | 12/1990 |
| WO | WO 92/04801 | 3/1992 |
| WO | WO 93/05452 | 3/1993 |
| WO | WO 93/11639 | 6/1993 |
| WO | WO 9414282 | 6/1994 |
| WO | WO 95/01058 | 1/1995 |
| WO | WO 95/01059 | 1/1995 |
| WO | WO 95/07003 | 3/1995 |
| WO | WO 95/32583 | 11/1995 |
| WO | WO 95/32585 | 11/1995 |
| WO | WO 96/07270 | 3/1996 |
| WO | WO 96/09721 | 3/1996 |
| WO | WO 96/13935 | 5/1996 |
| WO | WO 96/17473 | 6/1996 |
| WO | WO 97/07656 | 3/1997 |
| WO | WO 97/18675 | 5/1997 |
| WO | WO 97/31480 | 8/1997 |
| WO | WO 97/34414 | 9/1997 |
| WO | WO 97/42763 | 11/1997 |

| | | |
|---|---|---|
| WO | WO 97/48230 | 12/1997 |
| WO | WO 97/49237 | 12/1997 |
| WO | WO 97/49242 | 12/1997 |
| WO | WO 98/06219 | 2/1998 |
| WO | WO 98/17064 | 4/1998 |
| WO | WO 98/18260 | 4/1998 |
| WO | WO 98/19459 | 5/1998 |
| WO | WO 98/27723 | 6/1998 |
| WO | WO 98/31115 | 7/1998 |
| WO | WO 98/31116 | 7/1998 |

OTHER PUBLICATIONS

James Sorce et al., "Designing a Broadband Residential Entertainment Service: A Case Study," 13th International Symposium Human Factors in Telecommunications, Torino, Italy, Sep. 10-14, 1990 pp. 141-148.

Vito Brugliera, "Digital On-Screen Display—A New Technology for the Consumer Interface," Symposium Record Cable Sessions, 18th International Television Symposium and Technical Exhibition, Montreux, Switzerland Jun. 10-15, 1993, pp. 571-586 (Jun. 11, 1993).

CableData brochure, "A New Approach To Addressability" (undated).

Yee-Hsiang Chang et al., "An Open-Systems Approach to Video on Demand," IEEE Communications Magazine, vol. 32, pp. 68-80 (May 1994).

Matthew D. Miller, "A Scenario for the Deployment of Interactive Multimedia Cable Television Systems in the United States in the 1990's," Proceedings of the IEEE, vol. 82, No. 4, pp. 585-589 (Apr. 1994).

James, A., "Oracle—Broadcasting the Written Word," Wireless World, Jul. 1973, pp. 314-316.

McKenzie, G.A. "Oracle—An Information Broadcasting Service Using Data Transmission in the Vertical Interval," Journal of the SMPTE, Jan. 1974, pp. 6-10.

Edwardson, S.M., & Gee, A., "Ceefax: A Proposed New Broadcasting Ser.," Journal of the SMPTE, Jan. 1974, pp. 14-19.

Hedger J., "Telesoftware: Home Computing Via Broadcast Teletext," IEEE Transactions on Consumer Electronics, vol. Ce-25, No. 3, Jul. 1979, pp. 279-287.

Came, E.B. "The Wired Household," IEEE Spectrum, Oct. 1979, pp. 61-66.

Baer, R.H., "Innovation Add-On TV Products," IEEE Transactions on Consumer Electronics, vol. CE-25, Nov. 1979, pp. 765-771.

Karstad, K., "Microprocessor Control for Color-TV Receivers," IEEE Transactions on Consumer Electronics, vol. CE-26, May 1980, pp. 149-155.

"The New Media and Broadcast Policy: An Investigation & Research Conference Report on Broadcasting Diversification," Japan Ministry of Posts & Telecommunications, Mar. 1982.

Videotext Programmiert Videorecorder, Rundfunktech Mitteilungen, Broadcast Engineering Reports, vol. 26, Nov.-Dec. 1982. (TR).

Veith, R.H., "Television's Teletext," Elsevier Science Publishing Co., Inc., 1983, pp. 13-20, 41-51.

Chan, Patrick P. "Learning Considerations in User Interface Design: The Room Model," publication of the Software Portability Laboratory, University of Waterloo, Waterloo, Ontario, Canada, Jul. 1984.

Damouny, N. G., "Teletext Decoders—Keeping Up With The Latest Advances," IEEE Transactions on Consumer Electronics, vol. CE-30, No. 3, Aug. 1984, pp. 429-435.

Sealfon, Peggy, "High Tech TV," Photographic, Dec. 1984.

Rayers, D.J., "Telesoftware by Teletext," 1984 IEEE Conf. Papers, vol. 240, p. 323.

Lowenstein, R.L., and Aller, H.E., "Technology Review," vol. 88, Oct. 1985, p. 22.

M/A-COM, Inc., "Videocipher II Satellite Descrambler Owner's Manual," dated prior to Feb. 1986.

Tech Notes: Product Updates from M/A-COM Cable Home Group, "Videocipher Owner's Manual Update," Issue No. 6, Feb. 1986.

CableVision Advertisement for "TV Decisions," Aug. 1986.

Judice, C.N., "Move Over Cable, Here Comes Video Via Voice Lines," Network World, Sep. 1986, p. 26.

"Computer Network: Current Status and Outlook on Leading Science and Technology," vol. 1, Bureau of Science & Technology (Japan), Dec. 1986.

Merrell, "Tac Timer," 1986 NCTA Technical Papers, pp. 203-206.

"Facsimile Transmission," Author unknown, NHK Research Monthly Report, Dec. 1987.

Sunada et al., "Teletext Color Television Receiver Model C-29M950, C26M940," NEC Home Electronics, NEC Giho, 1987.

"Technological Examination & Basic Investigative Research Report on Image Databases," Japan Mechanical Engineering Organization Int'l Society for the Advancement of Image Software, Japan, Mar. 1988.

Bensch, U., "VPV Videotext Programs Videorecorder," IEEE Paper, Jun. 1988, pp. 788-792.

Chirstodoulakis, Stavros et al., "Browsing Within Time-Driven Multimedia Documents," publication of the Institute for Computer Research, University of Waterloo, Waterloo, Ontario, Canada, Jul. 1988, pp. 219-227.

Schlender, B.R., "Couch Potatoes! Now It's Smart TV," Fortune, Nov. 20, 1989, pp. 111-116.

"D2B-Home Bus Für Audio and Video" Selektor, No. 4, Apr. 1990, pp. 10,12.

Antonoffs, M., "Stay Tuned for Smart TV," Popular Science, Nov. 1990, pp. 62-65.

"Cable Television Equipment," Jerrold Communications Publication, dated 1992 and 1993, pp. 8-2.1 to 8-6 and 8-14.1 to 8-14.3.

Bestler, "Flexible Data Structure and Interface Rituals for Rapid Development of OSD Applications," 42nd Annual Convention and Exposition of the NCTA, pp. 223-236, San Francisco, CA, Jun. 6, 1993.

"Addressable Decoder with Downloadable Operation," Proceedings From The 42nd Annual Convention and Exposition of the NCTA, pp. 82-89 Jun. 6-9, 1993.

Mannes, George, "Smart Screens; Development of Personal Navigation Systems for TV Viewers," Video Magazine, Dec. 1993.

Various publications of Insight Telecast, 1992 and 1993.

Prevue Guide Brochure, Spring 1994.

Videocipher Stipulation, May 1996.

Transcript of the Deposition of John Roop, Oct. 1996, pp. 186-187.

Contents of the website of StarSight Telecast, Inc. (http://www.StarSight.com) as of Apr. 21, 2004.

Transcript of the testimony of Michael Faber and Larry Wangberg, May 1996, pp. 554-743.

Transcript of the testimony of Brian Klosterman, May 1997, pp. 1700-1981.

IPG Attitude and Usage Study, prepared by Lieberman Research Worldwide for Gemstar-TV Guide International, Oct. 2002.

Patent Abstracts of Japan vol. 017, No. 494, Sep. 7, 1993 and JP 05 122692 A (Pioneer Electron Corp), May 18, 1993.

Patent Abstracts of Japan vol. 098, No. 001, Jan. 30, 1998 and JP 09 247565 A (Sony Corp), Sep. 19, 1997.

Rundfunktechnische Mitteilungen, vol. 30, No. 1 Jan. 1986-Feb. 1986, Norderstedt (DE).

Symposium Record Cable Sesssions, "Digital On-Screen Display of a New Technology for the Consumer Interface," Publication Date May 1993.

Maehara et al, "Multimedia Technology in the Next-generation Audio-visual Products" Central Research Laboratories, Matsushita Electric Industrial Co., Ltd., translated Nov. 5, 2004, accessed on Aug. 12, 2010, publication date unknown.

Letter from StarSight Telecast, Inc. to a StarSight IPG subscriber (with subscriber name, address and account number redacted) notifying the subscriber of termination of the StarSight IPG., accessed on Aug. 12, 2010, publication date unknown.

RCA Satellite Receiver User's Manual, 2001.

VideoGuide User's Manual, 1995.

* cited by examiner

PROGRAM GUIDE SYSTEM WITH VIDEO WINDOW BROWSING

This application is a continuation of U.S. patent application Ser. No. 09/262,670, filed Mar. 4, 1999, which claims the benefit of U.S. Provisional Patent Application No. 60/086,051, filed May 19, 1998.

BACKGROUND OF THE INVENTION

This invention relates to interactive television program guides, and more particularly, to television program guides that support a video window function which may be used when browsing for available television programs. A television program, a program guide display and a program guide video window may be displayed on the display screen at the same time.

For a number of years certain television receivers have been equipped with a picture-in-picture (PIP) capability. In PIP mode, images of one television channel are displayed in the background while a PIP video window containing images of another channel is overlaid on a small area of the background. This feature allows viewers to simultaneously view video of programs being broadcast on two different channels. Television receivers with this capability typically contain two dedicated video tuners, one for the PIP window and one for the background screen. Viewers may enter and exit PIP mode by using specified keys on a remote control unit.

Television program guides help television viewers to select programs of interest. Viewers have traditionally consulted printed television program schedules to determine programs being broadcast at a particular time. Recently, cable, satellite, and broadcast television systems have provided viewers with an increasingly large number of television channels to choose from. As the number of potential programs of interest to the viewer has increased, interactive electronic program guides have been developed to help viewers determine which programs may be of particular interest. Such interactive program guides may be implemented using a microprocessor-controlled set-top box that is coupled to the viewer's television set. The set-top boxes receive program information from a central broadcasting center. Program information is stored in a memory within the set-top box. This information typically includes program titles, broadcast times, channels, program descriptions, etc.

Viewers can enter the "browse mode" of a program guide and use remote control cursor keys to scan through a list of available programming while still watching television. Once a program of interest has been located, the viewer can use a remote control to command the set-top box to tune to the displayed program listing.

Interactive programs guides may be arranged in a variety of formats. Some program guides display programming information as an overlay on top of a television channel. This type of arrangement does not allow viewers to browse video of other channels while continuing to view the video of a program in progress. Moreover, if the viewer is interested in video of a certain program listed on the program guide, he or she must first exit the program guide and then tune to that channel by pressing a select key.

Other program guides display a grid of current program listings on the viewer's display screen as an overlay on top of a television channel. As described in U.S. patent application Ser. No. 09/054,917, filed Apr. 2, 1998, the viewer may scroll a highlight region through the program listings while monitoring the program to which the system is tuned in a quarter-screen window. A text description of the highlighted program is also provided. This type of program guide covers the entire television screen and does not allow the viewer to watch video of two channels concurrently.

It is therefore an object of the present invention to provide a program guide system with improved browsing capabilities.

It is another object of the present invention to provide a program guide system that interacts with a video window so that a viewer may simultaneously view video from two different television channels.

It is another object of the present invention to provide a program guide system that allows a viewer to view both information about and video of a program to be shown at a future time.

It is further object of the present invention to provide a program guide system which allows a viewer to swap television programs back and forth between a program shown in a program guide video window and a program shown on a main video screen without having to exit the program guide.

It is yet another object of the present invention to provide a program guide system which allows a viewer to the switch audio signal broadcast by a television back and forth between a program shown on a program guide video window and a program shown on a background screen without having to exit the program guide.

SUMMARY OF THE INVENTION

These and other objects of the invention are accomplished in accordance with the principles of the present invention by providing an interactive television program guide system with a video window capability. Such a system and related methods are also described in U.S. patent application Ser. No. 09/262,670, filed Mar. 4, 1999, which is incorporated by reference herein in its entirety. The viewer may direct the program guide to display a program guide video window that contains video for a program currently being broadcast on another channel or a video clip of a program to be shown sometime in the future.

The program guide display of the present invention contains information for programs that are shown on particular channels during certain time intervals. Information about programs being shown at other times or on other channels is not displayed. The viewer may obtain information about available programming by browsing through channels on the program guide using cursor keys and/or numeric keys.

The viewer may direct the program guide to display a program guide video window on the viewer's television screen. The program guide video window may be activated and deactivated using any suitable means such as pressing a key on a remote control unit. The program guide video window may be used to browse video of programs currently shown on other channels, to browse video clips of future programs, or to browse programming that is available "on demand" (VOD programs). When the program guide display and the video window are active, the program guide may re-proportion the amount of screen area used by the current channel such that the program guide display, the video window, and current channel are displayed unobscured. However, if desired, the program guide display and the program guide video window may be superimposed on a portion of the viewer's television screen, blocking certain portions of the current channel. Both of these screen formats are arranged such that the viewer may continue to watch the current channel while the program guide and the program guide video window are displayed. Thus, the viewer may continue to watch one program while browsing video of other programs. As the viewer browses through other available programming, the contents of the program guide video window may be updated to match the program currently shown on the program guide.

The program guide display may also include brief text descriptions of the displayed programs. When the viewer browses through available programming with remote control keys, the brief descriptions may be automatically updated to correspond to the displayed programs.

The program guide may provide a swap feature which can be used to exchange a program shown in the program guide video window with a program shown on the main display screen. The viewer may direct the program guide to swap these programs using any suitable means such as pressing a swap key on a remote control unit. The "program swap" may be reversed by once again pressing (toggling) the swap key. One benefit of this feature is that it allows a viewer to directly tune the main display screen to a program of potential interest without having to exit the browse mode.

The program guide may also provide an audio select feature that can be used when both the program guide video window and the program guide display are active. The audio select feature enables the viewer to choose which audio signal is to be broadcast by the television, the audio signal from a program shown on the main display screen or the audio signal from a program shown in the program guide video window. The viewer may switch back and forth between these two audio signals by pressing an audio select key on a remote control unit. This allows a viewer to browse both the audio and video of a potential program of interest without having to exit the program guide.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
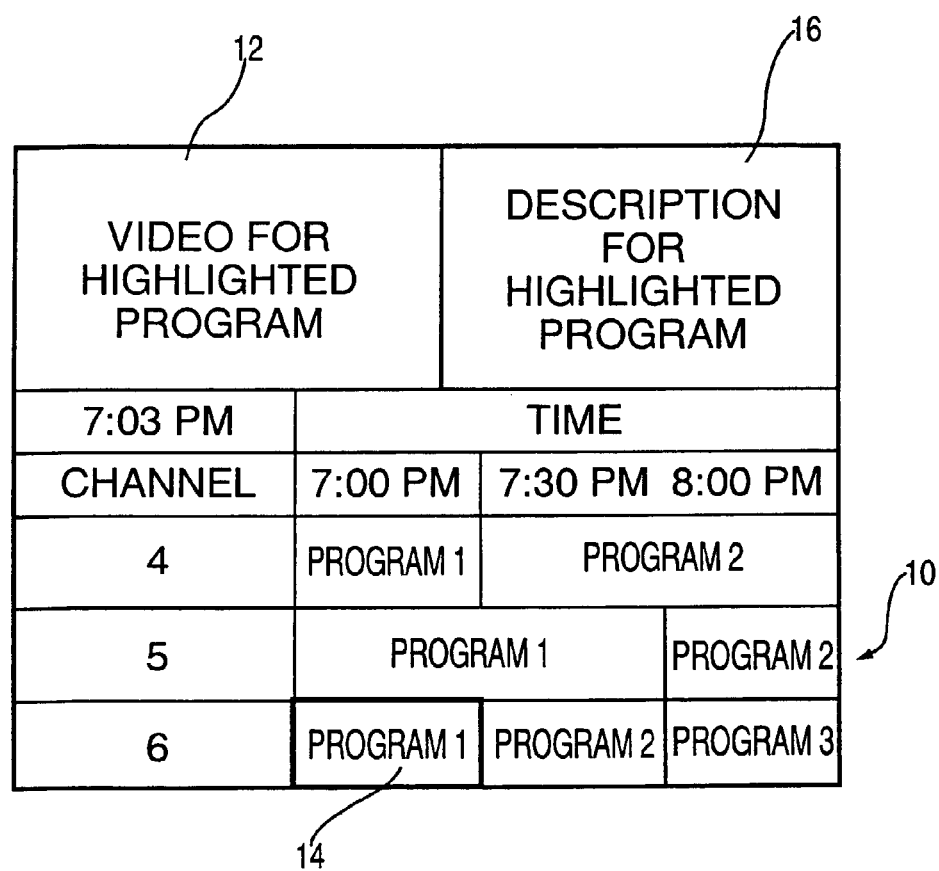
FIG. 1 is a display screen of a conventional program guide having a program list with a highlight region and a video window that contains programming that is always synchronized with the highlight region.

Conventional program guide systems have program listing display screens that allow viewers to browse for programming of interest. As shown in FIG. 1, one such conventional program guide displays a grid 10 of television program listings and a video window 12. In the horizontal dimension, program listings in the grid are organized by their scheduled broadcast time (e.g., 7:00, 7:30, and 8:00). In the vertical dimension, program listings are organized in channel order. The viewer may view information for additional channels and times by scrolling or panning highlight region 14 through the listings in grid 10. Video of a selected program may be displayed in video window 12 if the selected program is currently being broadcast. A text description of selected programs may be displayed in description window 16.

There are a number of disadvantages associated with the arrangement of FIG. 1. In particular, the program guide shown in FIG. 1 fills the entire display screen. This prevents the viewer from viewing a previously selected television channel while browsing for additional programming of interest.

Figure 2:
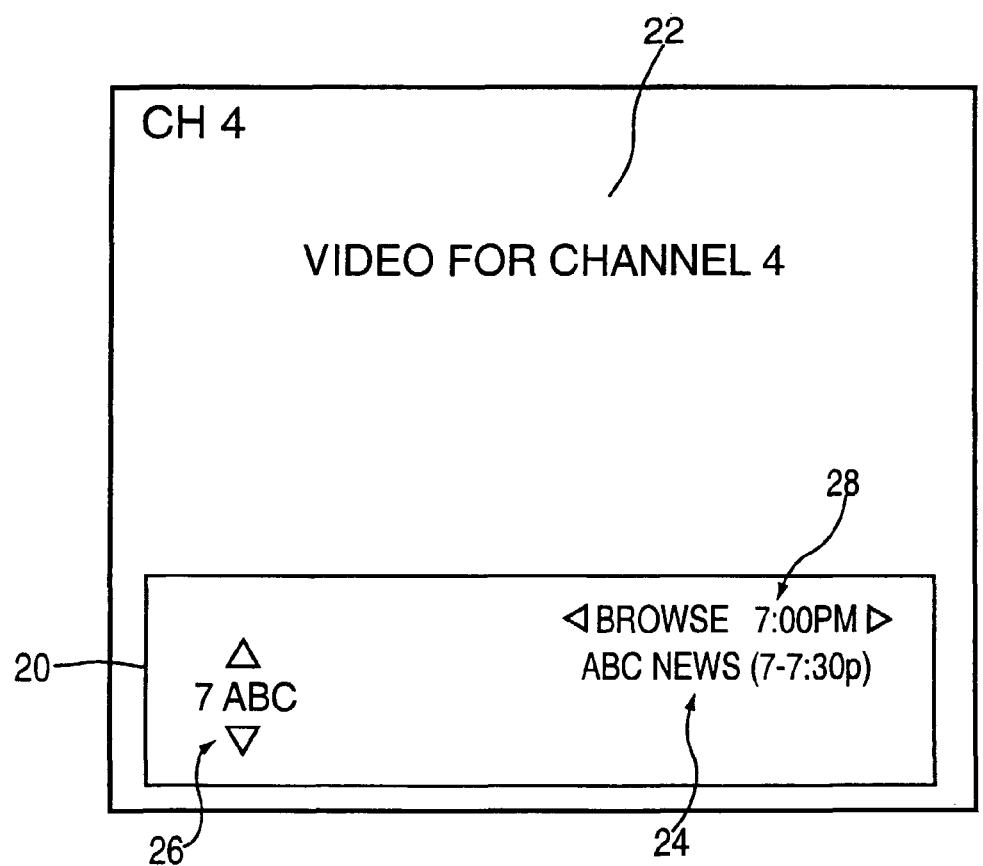
FIG. 2 is a display screen of a conventional program guide having a browse feature with which the viewer may view the titles of programs on channels other than the channel to which the system is presently tuned.

Another conventional program guide arrangement is shown in FIG. 2. In this arrangement, the viewer may invoke browse mode when it is desired to browse through program listings while continuing to view the current channel. The program guide presents a browse display 20 that is overlaid on top of a portion of the current channel 22. The viewer may view single program titles 24 for channels other than the current channel 22 and at time intervals other than the current browse time 28 using cursor keys to change browse channel 26 and/or browse time 28.

However, the browse arrangement of FIG. 2 does not allow the viewer to watch video from more than one channel at a time. When a program of potential interest is found, the viewer must exit browse mode and tune to that program in order to view the video of that program. If the viewer still desires to browse other programs, he or she must re-enter the browse mode and repeat this tentative selection process over and over again. This tends to make browsing through a number of programs time consuming. The viewer also cannot view video of programs to be shown in the future.

In contrast, the present invention provides a program guide having a browsing display that allows a viewer to browse through a list of available programs, select a program of interest, and view video of that program in a program guide video window while continuing to view a previously selected television channel. The program guide display may be a single cell in width (i.e., in the time dimension) and a single cell in length (i.e., in the channel dimension). Or, if desired, multiple cells may displayed in either or both the time and channel dimensions. A brief text program description may also be provided in the cell for displaying a description of the currently listed program. If the viewer desires to watch video of a listed program, the viewer may invoke a program guide video window to display the selected program without exiting the browse display. This may be accomplished by pressing a key on a remote control unit such as a video window key.

Figure 3:
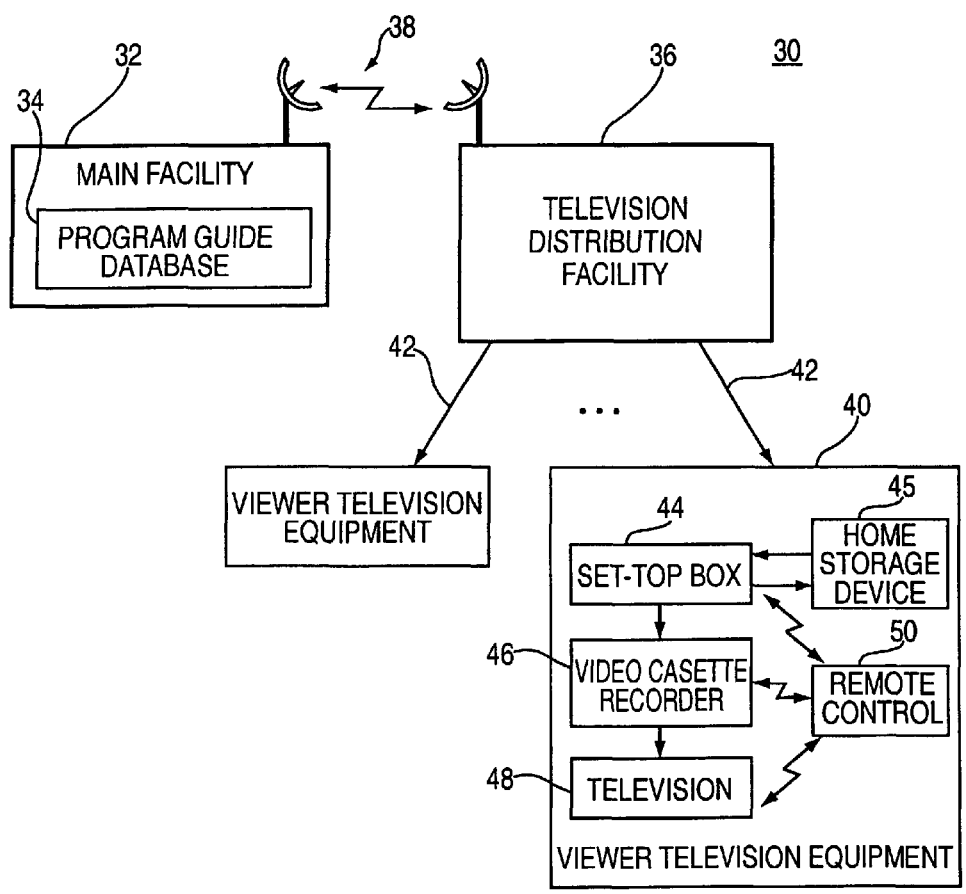
FIG. 3 is a diagram of a system in which an interactive television program guide is implemented in accordance with the present invention.

An illustrative program guide system 30 that may be used with the present invention is shown in FIG. 3. Main facility 32 contains a program guide database 34 for storing program guide information such as television program guide listings data, pay-per-view ordering information, television program promotional information, etc. Information from database 34 may be transmitted to television distribution facility 36 via communications link 38. Link 38 may be a satellite link, a telephone network link, a cable or fiber optic link, a microwave link, a combination of such links, or any other suitable communications path. If it is desired to transmit video signals over link 38 in addition to data signals, a relatively high bandwidth link such as a satellite link is generally preferable to a relatively low bandwidth link such as a telephone line.

Television distribution facility 36 is a facility for distributing television signals to users, such as a cable system headend, a broadcast distribution facility, or a satellite television distribution facility.

The program guide information transmitted by main facility 32 to television distribution facility 36 may include television program listings data for current programs, future programs, and video-on-demand (VOD) programs. The television program listings data for each program may include (but is not limited to) the title of the program, the channel for the program, a scheduled broadcast time (start time) and an ending time (or duration). Other typical program data may include ratings, critics ratings, brief text descriptions, genres (sports, movies, children, etc.), actors, etc. Transmitted program information may also include advertising information and pay program data such as pricing information for individual programs and subscription channels, time intervals for ordering programs and channels, telephone numbers for placing orders that cannot be impulse ordered, etc.

Television distribution facility 36 distributes television programming and program guide information to the viewer television equipment 40 of multiple users via communications paths 42. For example, television programming may be distributed over analog television channels and program guide data may be distributed over an out-of-band channel on paths 42. Data distribution may also involve using one or more digital channels on paths 42. Such digital channels may also be used for distributing television programming and other information. Viewer television equipment 40 typically contains set-top boxes 44. Viewer television equipment may also be suitable equipment into which circuitry similar to set-top box circuitry has been integrated, an advanced television receiver (such as HDTV), a personal computer television (PC/TV), or any other suitable television equipment. Multiple television and audio channels (analog, digital, or both analog and digital) may be provided to set-top boxes 44 via communications paths 42. If desired, program listings and other information may be distributed by one or more distribution facilities that are similar to but separate from television distribution facility 36 using communications paths that are separate from communications paths 42.

It will be understood that program guide system 30 is just one example of a program guide system that may be used in accordance with the present invention. Any other suitable program guide system may be used if desired. For example, a client-server type configuration that receives data from a high speed communications link could be used. One benefit of such a system is that it may eliminate the need to store program guide information in the viewer's set-top box.

Certain functions such as pay program purchasing may require set-top boxes 44 to transmit data to television distribution facility 36 over communications paths 42. For example, if a viewer wanted to order a VOD program, data from set-top box 44 may have to be transmitted to distribution facility 36. If desired, such data may be transmitted over telephone lines or other separate communications paths. If functions such as these are provided using facilities separate from television distribution facility 36, some of the communications involving set-top boxes 44 may be made directly with the separate facilities.

Each viewer television equipment 40 has the capability to simultaneously receive, decode and display two separate video signals. For example, viewer television equipment 40 may use a two-tuner set-top box. The tuners may have analog, digital, or mixed analog and digital capabilities. If desired any other suitable arrangement may be used to handle the simultaneous display of two video signals.

Program guide data is distributed to viewer television equipment 40 periodically. Television distribution facility 36 may also poll viewer television equipment 40 periodically for certain information (e.g., pay program account information or information regarding programs that have been purchased and viewed using locally-generated authorization techniques). Main facility 32 preferably contains a processor to handle information distribution tasks. Each viewer television equipment 40 preferably contains a processor to handle tasks associated with implementing an interactive television program guide on the viewer television equipment 40. Television distribution facility 36 may contain a processor for tasks associated with monitoring a viewer's interactions with the interactive program guide implemented on set-top boxes 44 and for handling tasks associated with the distribution of program guide data and other information to viewer television equipment 40.

Each set-top box 44 in viewer television equipment 40 may be connected to a videocassette recorder 46 and a home storage device 45. Video cassette recorder 46 allows selected television programs to be recorded. Each videocassette recorder 46 may be connected to a television 48. To record a program, set-top box 44 tunes to a particular channel and sends control signals to videocassette recorder 46 (e.g., using an infrared transmitter) that direct videocassette recorder 46 to start and stop recording at the appropriate times. Program guide system 30 may store certain information such as VOD programs and VOD program data in home storage device 45 via set top box 44.

During use of the interactive television program guide implemented on set-top box 44, television program listings and other information may be displayed on television 48. Such program guide displays may be presented on a television screen so as not to obscure a program to which the viewer has tuned with set-top box 44, or if desired, may be presented as an overlay on top of a portion of a television program. Each set-top box 44, videocassette recorder 46, and television 48 may be controlled by one or more remote controls 50 or any other suitable viewer input interface such as a wireless keyboard, mouse, trackball, dedicated set of buttons, etc.

Figure 4:
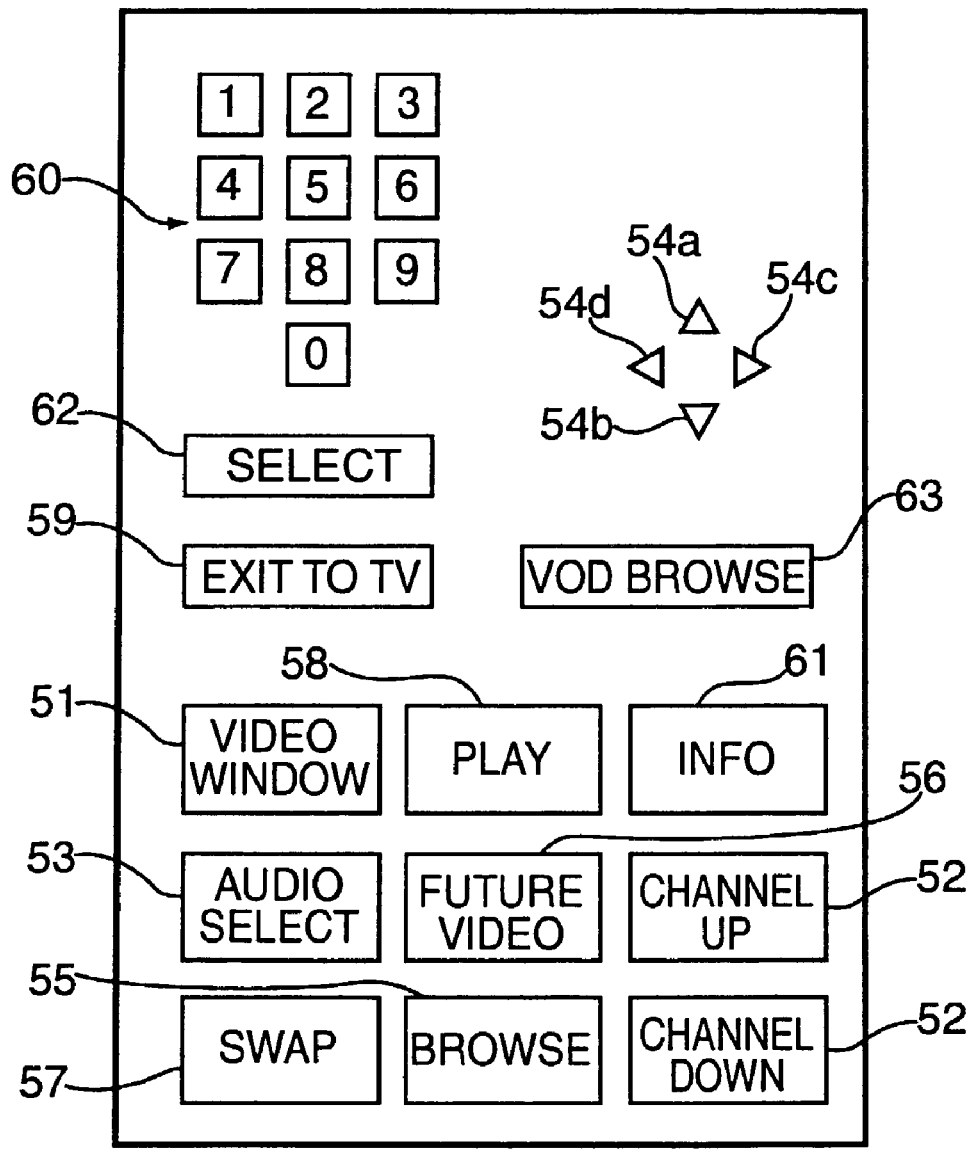
FIG. 4 is a diagram of an illustrative remote control for use with the program guide system of the present invention.

An illustrative remote control 50 is shown in FIG. 4. During normal operation, the viewer may use any suitable key to toggle the program guide display on and off the main display screen. For example, the viewer may use browse key 55, cursor keys 54 or an on-screen button (not shown). Channel up and down keys (channel keys) 52 may be used to change the channel to which set-top box 44 is tuned. VOD browse key 63 may be used to enter and exit video-on-demand (VOD) browse mode. Play key 58 may also be used to enter VOD browse mode. Info key 61 may be used to obtain more detailed information about a program and/or to view other available options. Up and down cursor keys 54a and 54b may be used to vertically scroll through the available channels on the program guide. Left and right cursor keys 54c and 54d may be used to change the time interval for which programming is shown on the program guide. Select key 62 may be used to obtain more information about a particular program or to make selections such as when ordering VOD programs by selecting one such VOD program from the available program listings. Numeric keys 60 may be used to directly select a desired channel during both normal television viewing mode and browsing mode. Exit to TV key may be used to exit browse mode and return to normal television viewing mode. While the program guide video window is active, audio select key 53 may be used to switch the audio signal being broadcast by the television back and forth between the main screen audio signal and the video window audio signal. Also while program guide video window 80 is active, swap key 57 may be used to interchange or "swap" the programs shown on the main display screen and the program guide video window. When browsing through programming to be shown in the future, the viewer may request a video clip of future programming by using future video key 56 or video window key 51. Various other keys (not shown) may be used for functions such as controlling power, videocassette recorder (VCR) functions, volume control, etc. The keys for remote control 50 of FIG. 4 represent just one illustrative example of a suitable remote control arrangement. Alternate labeling and key placement may be used if desired. For example, some or all of the keys may be implemented as on-screen buttons. Furthermore, remote control 50 need not necessarily be remote, any suitable input method may be used if desired.

Figure 5A:
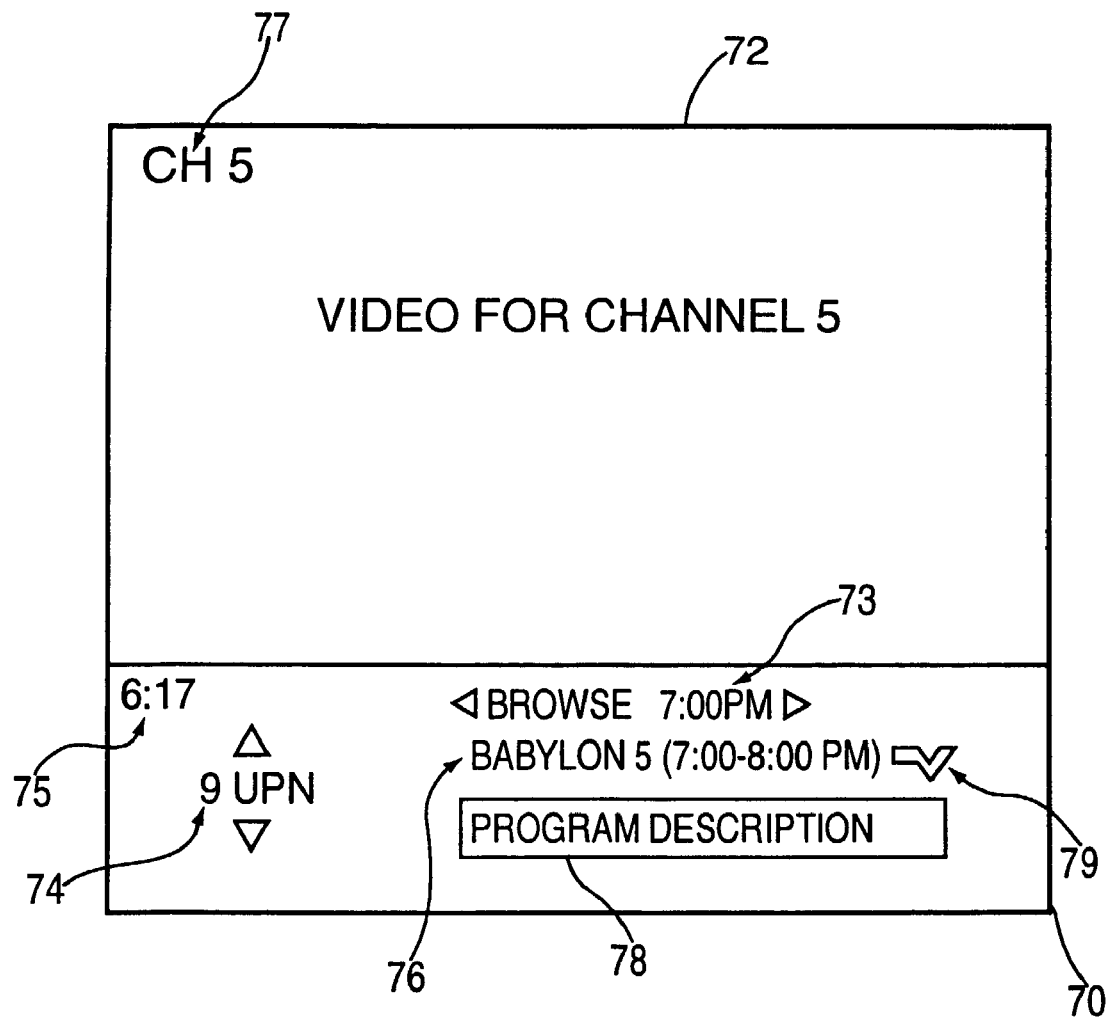
FIG. 5a is an illustrative display screen of a program guide in accordance with the present invention showing the area occupied by the current channel reduced to accommodate the program guide display.

As shown in FIG. 5a, the viewer may direct set-top box 44 to present program guide display 70 on main display screen 72. Set-top box 44 may reproportion (i.e., shrink) the amount of screen area used by current channel 77 (channel 5) such that main display screen 72 displays both program guide display 70 and current channel 77 unobscured. However, if desired, program guide display 70 may also be superimposed on top of a portion of current channel 77 (channel 5) as shown in FIG. 5b.

Program guide display 70 may be invoked using any suitable technique such as by pressing a button on remote control 50. The viewer may browse through program titles 76 by changing browse channel 74 and/or browse time 73 while continuing to view a previously selected television program on display screen 72.

Figure 5B:
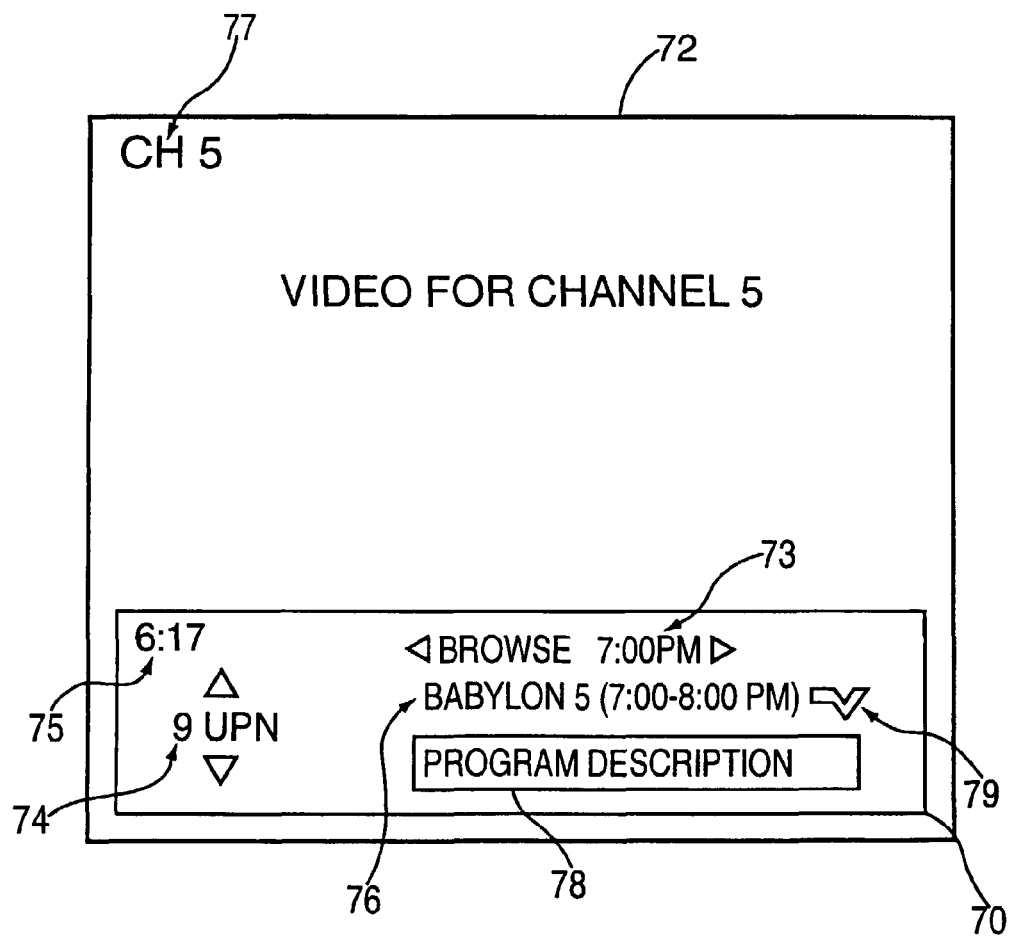
FIG. 5b is another illustrative display screen of a program guide in accordance with the present invention showing the program guide display superimposed on the current channel.

Although the program guide display 70 shown in FIGS. 5a and 5b is only a single cell or element in width (i.e., in the time dimension), and a single cell or element in length (i.e., in the channel dimension), it may also be displayed as multiple cells in either or both dimensions (not shown). Program guide 70 preferably includes information about the program(s) shown on the selected channel(s) during the selected time interval(s) (i.e., the programs being provided by television distribution facility 36 of FIG. 3 via cable, wireless cable, satellite, or traditional broadcasting) and may include additional information such as program previews, advertising, etc. (not shown).

Each cell in program guide display 70 may include a program description box 78 that contains a brief text description of the program title(s) currently shown on guide 70. For example, in the arrangement shown in FIG. 5a, the program title "Babylon 5" is shown, so program description box 78 contains a brief text description of the Babylon 5 program. The viewer may press info key 61 on remote 50 (FIG. 4) to obtain more detailed information about that program and/or to view other available options. Select key 62 or on screen button may be used to select the other options.

The viewer may navigate through the available program listings without exiting the program guide display. For example, a viewer may scroll through program listings by using up and down cursor keys 54a and 54b (FIG. 4). Program guide display 70 may also be directly commanded to a particular channel of interest using numeric keys 60.

If a viewer who is browsing the program listings on program guide display 70 becomes interested in a particular program, the viewer can direct the program guide to invoke program guide video window 80 to display video for that program. For example, in FIG. 6a, assume the viewer becomes interested in a program on channel 11. By pressing a key such as video window key 51 (FIG. 4), the viewer can direct the program guide to make program guide video window 80 appear and display video for the new channel of interest (channel 11). This allows the viewer to simultaneously view video from one channel on the main display screen 72 (channel 5) and video from a second channel (channel 11) in program guide video window 80. When the viewer no longer desires to use program guide video window 80, it may be deactivated by once again pressing (toggling) video window key 51. In addition, program guide video window 80 may be automatically activated upon invoking program guide display 70 or deactivated depending upon the availability of video for the programs displayed on guide 70.

Figure 6A:
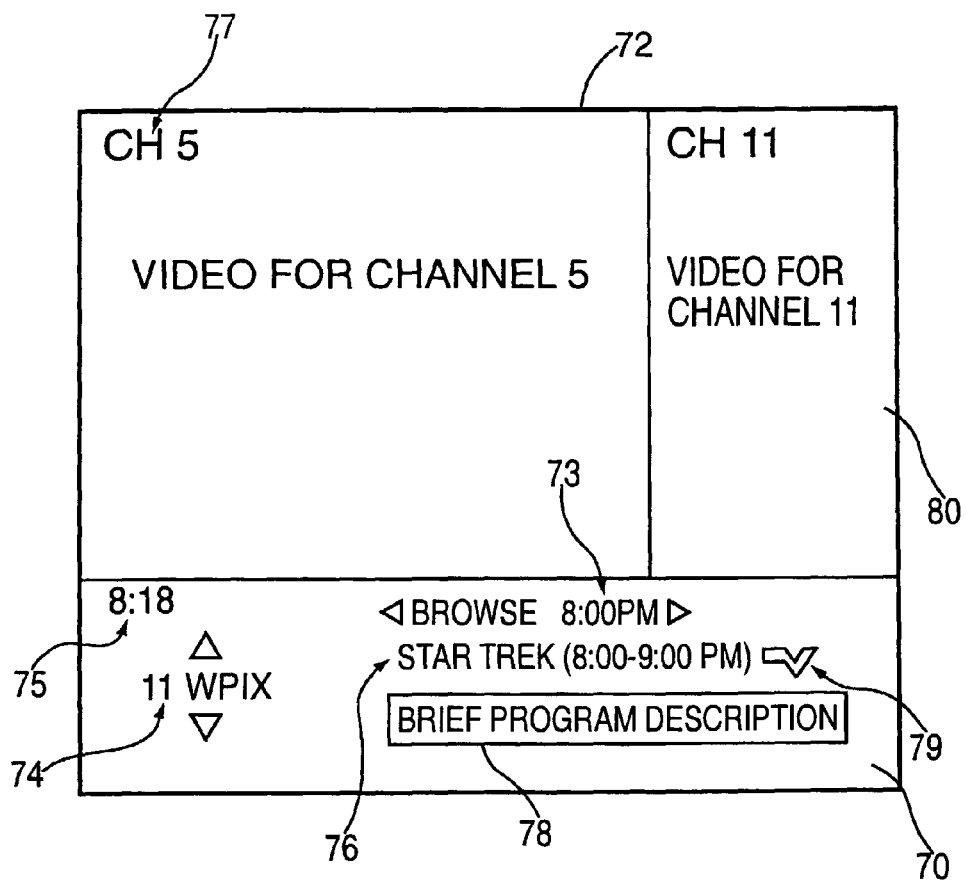
FIG. 6a is an illustrative display screen of a program guide in accordance with the present invention showing the area occupied by the current channel reduced to accommodate both the program guide display and the program guide video window.
Figure 6B:
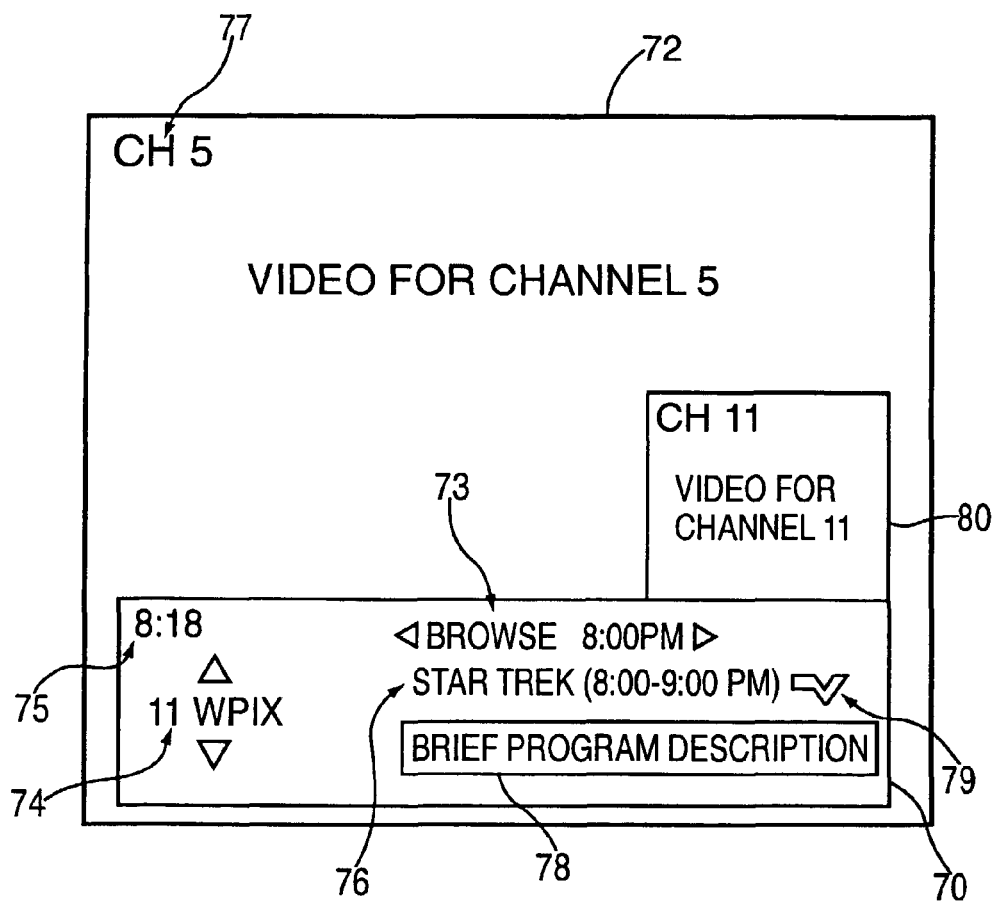
FIG. 6b is an illustrative display screen of a program guide in accordance with the present invention showing the program guide display and the program guide video window superimposed on the current channel.

Program guide video window 80 may be presented on main display screen 72 in various formats. This is illustrated in FIGS. 6a and 6b. For example, in FIG. 6a, the amount of screen area occupied by current channel 77 (channel 5) may be reduced so that program guide display 70, current channel 77, and program guide video window 80 are displayed unobscured. In alternate embodiments, program guide video window 80 and/or program guide display 70 may be superimposed on top of a portion of current channel 77 (channel 5) as shown in FIG. 6b.

As the viewer browses the program listings with cursor keys 54 or numeric keys 60, the content of program guide video window 80 may change to reflect the program shown on the program guide. For example, in the arrangement shown in FIG. 6a, the program "Star Trek" is shown on program guide display 70, so program guide video window 80 displays video of the Star Trek program. When another program is browsed such as the "Deep Space Nine" program on channel 14, program guide video window 80 may automatically tune to channel 14 and display video of the Deep Space Nine program (shown in FIG. 7). Thus the content of program guide video window 80 may be in synchronization with the current program shown on program guide display 70.

A viewer may also be permitted to view video of a given program in program guide video window 80 while continuing to browse through other program listings on program guide display 70. For example, in FIG. 7, a viewer may direct the program guide to keep video window 80 tuned to channel 14 and browse through other channels on program guide display 70. One way this may be accomplished is by allowing a viewer to press a key on remote control 50 such as select key 62 to "lock" program guide video window 80 to a certain channel and then use the up and down cursor keys 54a and 54b (FIG. 4) to browse through additional channels on program guide display 70. The viewer may once again bring program guide video window 80 and program guide display 70 into synchronization by toggling select key 62. This feature allows the viewer to simultaneously view programs on main display screen 72 and program guide video window 80 while browsing through program listings with program guide display 70.

Figure 7:
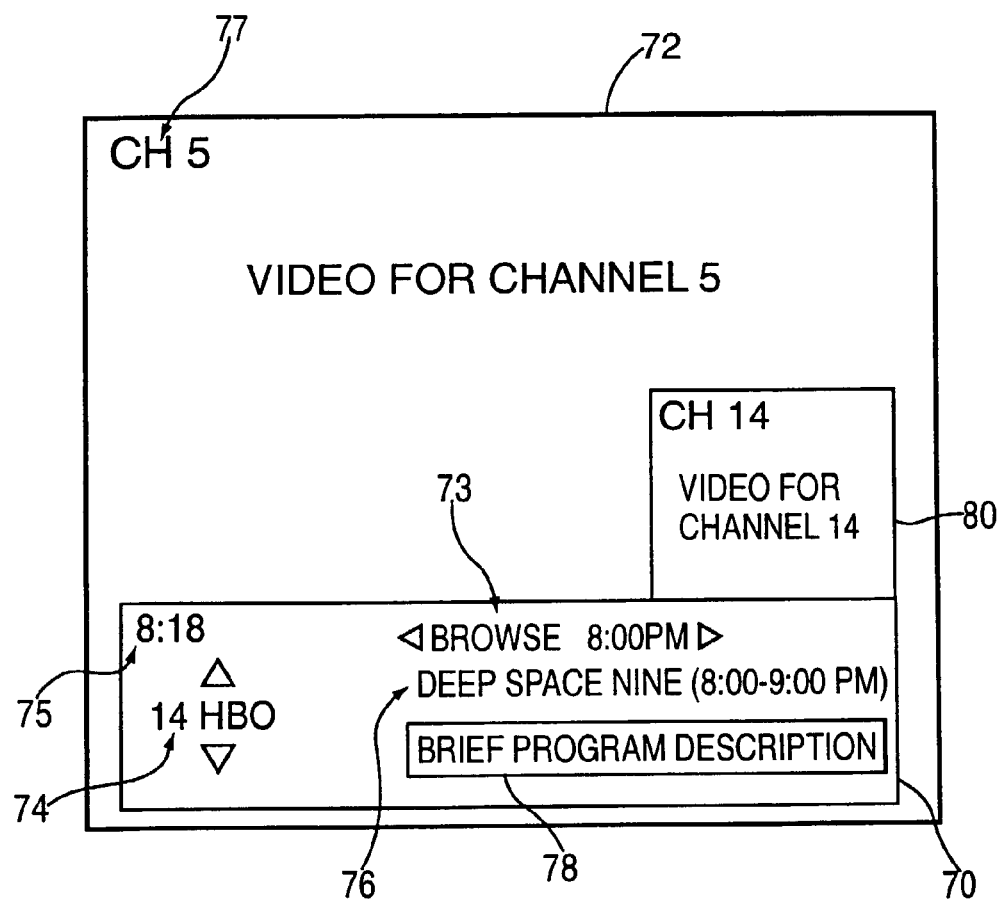
FIG. 7 is an illustrative display screen of a program guide in accordance with the present invention showing that the program displayed in the program guide video window may be automatically updated to correspond to the program currently shown on the program guide display.

While in browse mode, the television program for the channel to which set-top box 44 is currently tuned continues to be displayed on the main display screen 72. This is shown in FIGS. 5-7. Although the viewer has scrolled through several channels on program guide display 70, the video on main display screen 72 remains tuned to channel 5. The content of main display screen 72 is therefore not always in synchronization with the program currently shown on program guide display 70. However, each time the viewer scrolls the program guide to a new program listing, program description box 78 is updated to display information for the new program listed in program guide display 70. As a result, the viewer can watch a selected television channel while browsing automatically updated video and text descriptions of a program on another channel.

The browse feature may be used to view information about programming to be shown at different times. This may be accomplished by using right and left cursor keys 54c and 54d to adjust time interval 73. Time interval 73 indicates the time range for which programming information is being displayed. As shown in FIG. 5, time interval 73 is set to the 7:00 PM time slot, therefore, program guide display 70 displays information about programming to be shown on channel 9 at 7:00 PM. If desired, the viewer may adjust time interval 73 to a particular time and thus obtain information about programming in that time slot. For example, in FIG. 5, if the viewer presses cursor key 54c once, time interval 73 may increment to 7:30 PM. Program guide display 70 will automatically update and display information about the program to be shown on channel 9 at 7:30 PM. If cursor key 54c is pressed again, browse time interval 73 may increment to 8:00 PM, and information is displayed about the program to be shown in that time slot, etc. Left cursor key 54d may operate in a similar fashion to decrement time interval 73. Each time the viewer changes the value of time interval 73, program guide display 70 automatically updates to display information for the program to be shown at that time.

Program guide display 70 need not remain set to a particular channel in order for the viewer to view information about future programming. The viewer may set time interval 73 to a particular time in the future and scroll through the different channels 74 available in program guide display 70. For example, in FIG. 5, current time indicator 75 shows the current time as 6:17 PM. Time interval 73 is set to a future time slot (7:00 PM). If desired, the viewer may browse through the channels to obtain information about programming to be shown at 7:00 PM.

If a viewer who is browsing through future program listings becomes interested in a particular program, the viewer can direct the program guide to activate program guide video window 80 to display a video clip for that program. For example, in FIG. 5a, if the viewer becomes interested in the Babylon 5 program, he or she may press a key such as the future video key 56 (FIG. 4) to request a video clip of that program. If a video clip for that program is available, program guide video window 80 may appear and display that clip. If desired, the remote control key used to request video clips may be the same as the key used to invoke program guide video window 80 (i.e., video window key 51 shown in FIG. 4). In this case, the program guide may automatically check the broadcast time of the selected program to determine if the selected program is currently being broadcast or if a video clip for that program needs to be requested.

Viewer television equipment 40 may contain a two-tuner set-top box 44 or other suitable equipment which has the capability to receive and decode two separate video signals and simultaneously display one of those video signals on main display screen 72 and the other signal in program guide video window 80. If the viewer is watching a program on main video screen 72 and wants to view video of another program currently being broadcast, the viewer may direct set-top box 44 to tune to and display that channel in program guide video window 80.

However, in order to watch a video clip of a future program, the viewer may need to direct the program guide to request a video clip for that program. Such video clips may be provided from a video server or other suitable television distribution device located at distribution facility 36 or at a network node associated with television distribution facility 36. Program guide display 70 may display an icon such as icon 79 to indicate that a particular program has an available video clip. If a video clip is available for the selected program, the server routes a signal of that clip to the viewer's location where it is displayed in program guide video window 80.

If desired, alternate architectures for delivering video clips may be used. For example, a video distribution system may constantly broadcast video streams that include a list of multiple video clips. The program guide may scan the list and select the video clip with the desired video and the most desirable start time. That video clip would then be displayed in program guide video window 80 when broadcast. One benefit of such a scheme is that it requires no return path from user television equipment 40 and may reduce the amount of data the program guide is required to manage and store.

Thus, a viewer may simultaneously view video of a channel currently being broadcast on the main display screen 72 (channel 5 in the FIG. 5a example) and a video clip of a future program (Babylon 5) in program guide video window 80. When the viewer no longer wants to view the video clip, program guide video window 80 may be deactivated using any suitable technique such as toggling video window key 51. Alternatively, the video clip may be shown only once, and then program guide video window 80 is automatically deactivated. If desired, a single frame of video may be used in place of a video clip.

The program guide may have a swap feature that can be used while program guide video window 80 and program guide display 70 are active. The swap feature allows the viewer to interchange a program shown on main display screen 72 with a program shown in program guide video window 80 (and vice versa). For example, in FIG. 6a, main display screen 72 is tuned to a program on channel 5 and program guide video window 80 is tuned to a program on channel 11. After browsing the video of channel 11, a viewer may desire to view that channel on main display screen 72. This may be accomplished by pressing a key on remote 50 such as swap key 57 (FIG. 4). When swap key 57 is pressed, program guide video window 80 automatically tunes to channel 5 and main display screen 72 automatically tunes to channel 11, thus "swapping" the two channels. Program guide display 70 may update and display information for the channel previously shown on main screen 72 (channel 5). This feature permits the viewer to directly tune main screen 72 to a new channel of interest (i.e., without having to exit the browse mode and then tune main display screen 72 to the desired channel). Program guide 70 may automatically swap the programs back when either browse channel 74 or time interval 73 are changed.

The program guide may also have an audio select feature that can be used while program guide video window 80 is active. The audio select feature enables the viewer to choose which audio signal is to be broadcast by the television, either the audio signal from a program on main display screen 72, or the audio signal from a program in program guide video window 80. For example, in FIG. 6a, main display screen 72 is tuned to channel 5 and program guide video window 80 is tuned to channel 11. Assume program guide 70 has been initially set by the viewer to broadcast the audio signal of the program being shown on main screen 72 (channel 5). After browsing the video of a program in program guide video window 80, the viewer may want to listen to the audio of that program. By pressing a key on remote 50 such as audio select key 53 (FIG. 4) the audio signal being broadcast by television 48 switches from the program shown on main screen 72 (channel 5) to the program shown on program guide video window 80 (channel 11). A viewer can therefore browse both the audio and video of a potential program of interest without having to exit the browse mode. The audio signal of main display screen 72 may be returned by once again pressing (toggling) audio select key 53.

The viewer may be allowed to select the default source of the audio signal. For example, the viewer may set the program guide to broadcast the audio signal from video window 80 whenever video window 80 is activated. In this case, the viewer may use audio select key 80 to swap the audio signals so that the audio signal broadcast by television 48 is from the program shown on main display screen 72. Moreover, the viewer may be allowed to select whether or not program guide 70 automatically swaps the audio signal back when either browse channel 74 or time interval 73 are changed.

The program guide may also offer a browse feature for programming which may be available "on demand." Such programming may be known as "video on demand" or "VOD" and may include programs that are available at any time for viewing. This allows the viewer to select and watch certain programs at his or her convenience. VOD programs may include "pay-per-view" or subscription services. These programs may be stored in a database of a video server located at suitable locations in cable system 30 such as at television distribution facility 36 or at a network node associated with television distribution facility 36.

As shown in FIG. 3, program guide system 30 may also store VOD programs and VOD program data in home storage device 45 via set top box 44. Home storage device 45 may include a writable optical storage device (such as a DVD player capable of handling recordable DVD discs), a magnetic storage device (such as a disk drive or digital tape), or any other suitable analog or digital storage device. Home storage device 45 may support a directory structure containing information associated with stored entries. This directory information may be stored in one location, for example at the beginning or the end of the storage device. The directory information can also be distributed (e.g., by storing a portion of such information at the same location as each entry). For removable storage media like DVDs, each storage unit may have its own directory information.

Home storage device 45 can be contained in set-top box 44 or it can be an external device connected to set-top box 44 via an output port and appropriate interface. If home storage device 45 is a digital storage device, processing circuitry in set-top box 44 may format the video, audio and data signals received from television distribution facility 36 into a digital file format. The file format may be an open file format such as the Motion Pictures Expert Group (MPEG) MPEG-2 standard. The resulting data may be transmitted to home storage device 45 via an appropriate bus (e.g., a bus using the IEEE 1394 standard), and is stored on digital storage device 45.

Figure 8:
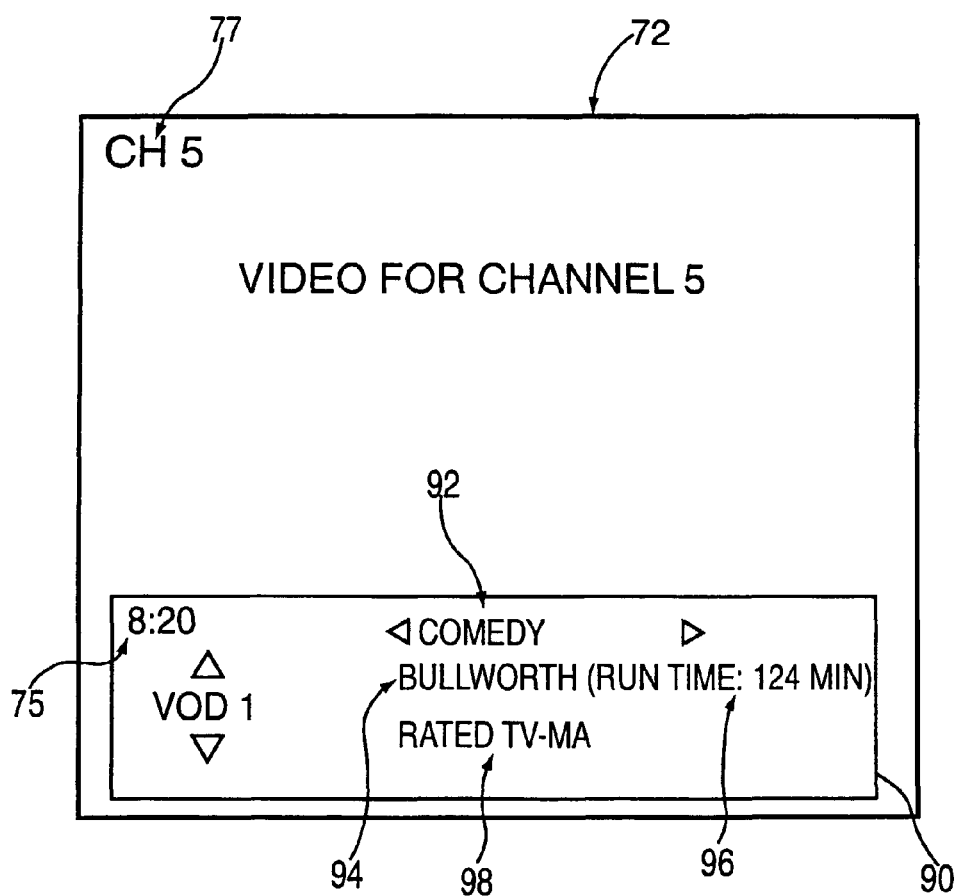
FIG. 8 is an illustrative display screen for a video-on-demand program guide in accordance with the present invention.

As shown in FIG. 8, set-top box 44 can be directed to present VOD program guide display 90 on main display screen 72 so that the viewer can scroll through a list of VOD programs while simultaneously viewing a television program on main display screen 72. The viewer may enter VOD browse mode using any suitable technique. For example, VOD browse mode may be entered directly by using a dedicated key on remote control unit 50 such as play key 58 (FIG. 4) or by pressing on-screen button on the program guide display (not shown). VOD browse mode may also be accessed by first entering normal browse mode and then selecting a designated VOD channel using the up and down cursor keys 54a and 54b or numeric keys 60.

Figure 9:
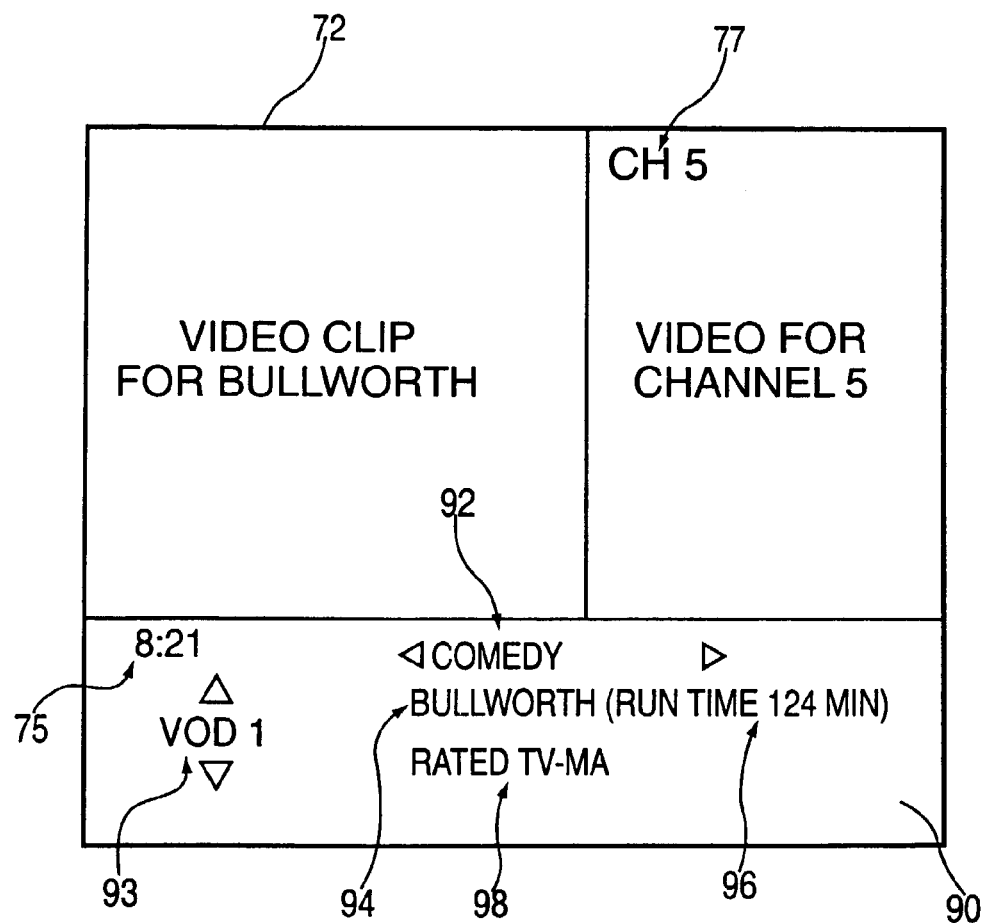
FIG. 9 is an illustrative display screen for a video-on-demand program guide in accordance with the present invention showing the area occupied by the current channel reduced to accommodate both the video-on-demand program guide display and the program guide video window.

VOD program guide 90 and program guide video window 80 may be presented on main display screen 72 in various formats. This is illustrated in FIGS. 8 and 9. For example, in FIG. 9, the amount of screen area occupied by current channel 77 (channel 5) may be reduced so that VOD program guide display 90, current channel 77, and program guide video window 80 are displayed unobscured. In alternate embodiments, such as the one shown in FIG. 8, VOD program guide display 90 (and/or program guide video window 80 [not shown]) may be superimposed on top of a portion of current channel 77 (channel 5).

VOD program guide display 90 preferably contains information about a particular VOD program. If desired, such VOD programs may be organized according to certain categories 92 such as "recent releases," "sitcoms," "action/adventure," "comedy," etc. In the example of FIG. 8, the viewer is viewing programs in the comedy category and information is displayed about a particular comedy program that is available on demand. The displayed information may include (but is not limited to) the program title 94 (Bullworth), the length or "run-time" of that program 96 (124 minutes) and the program's rating 98 (TV-MA). More detailed information about a particular program may be available by pressing info key 61 (FIG. 4). Such detailed information may include plot summary, actors and actresses, etc., and may appear on main screen 72 or a separate detailed information screen (not shown).

The viewer may scroll through the programs listings 93 in a given VOD category 92 by using any suitable key on remote 50 such as up and down cursor keys 54a and 54b (FIG. 4). VOD category 92 may be changed by using any suitable key on remote 50 such as right and left cursor keys 54c and 54d (FIG. 4). If desired, a VOD program may be ordered by using a key on remote 50 such as select key 62 or an on-screen button which may appear, for example, on the detailed information screen.

Figure 10:
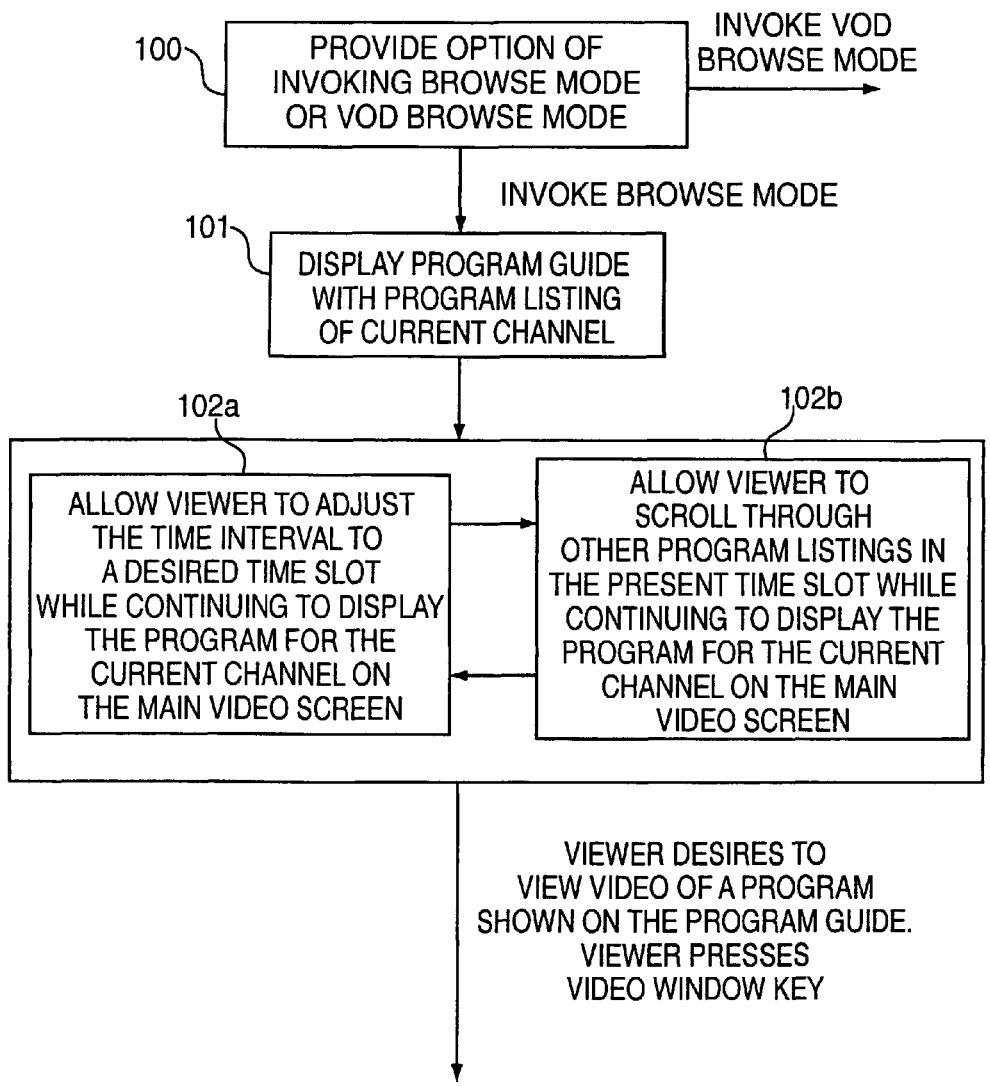
FIGS. 10-12 are flow charts illustrating steps involved in providing browsing display screens in accordance with the present invention.
Figure 11:
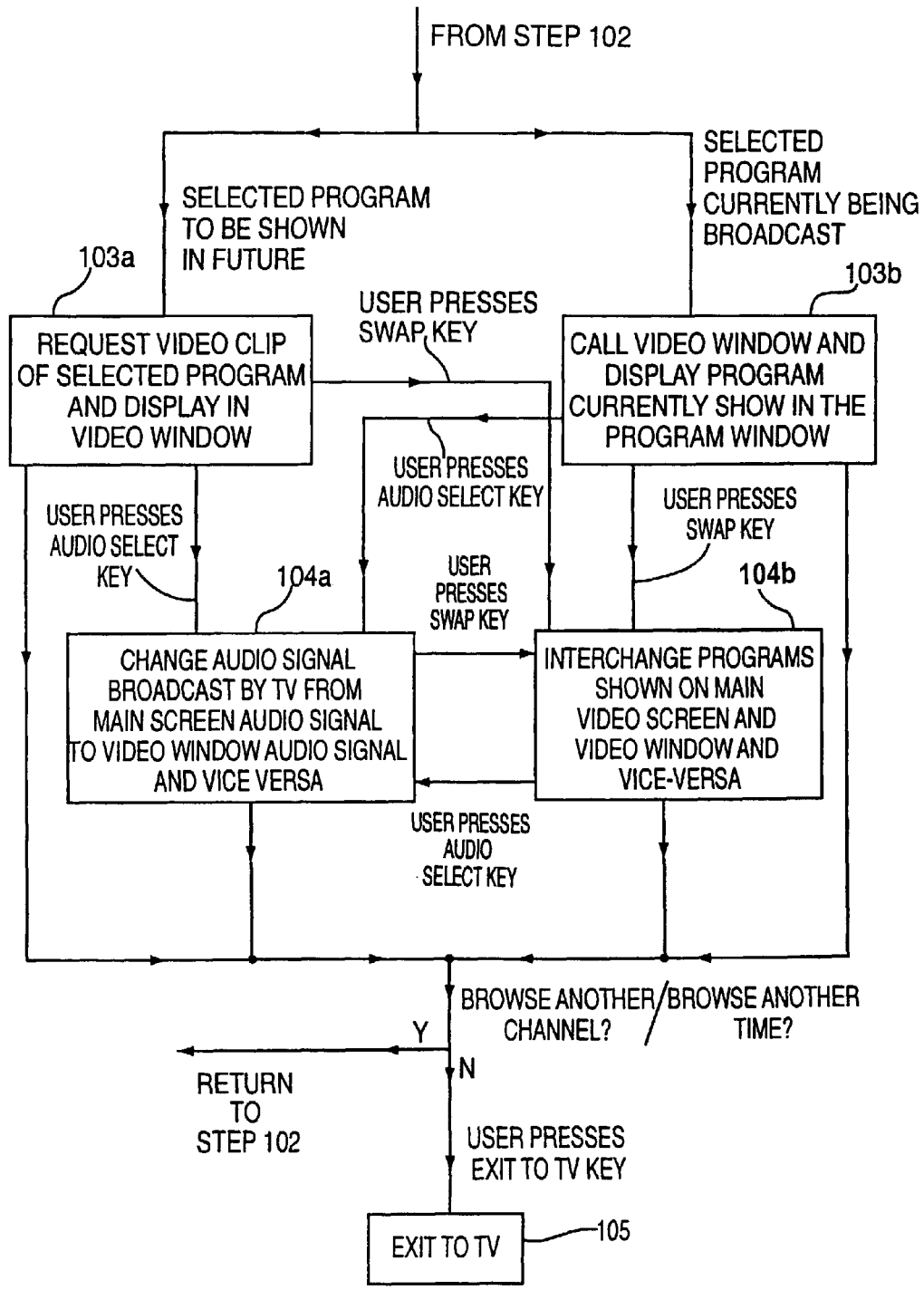
Figure 12:
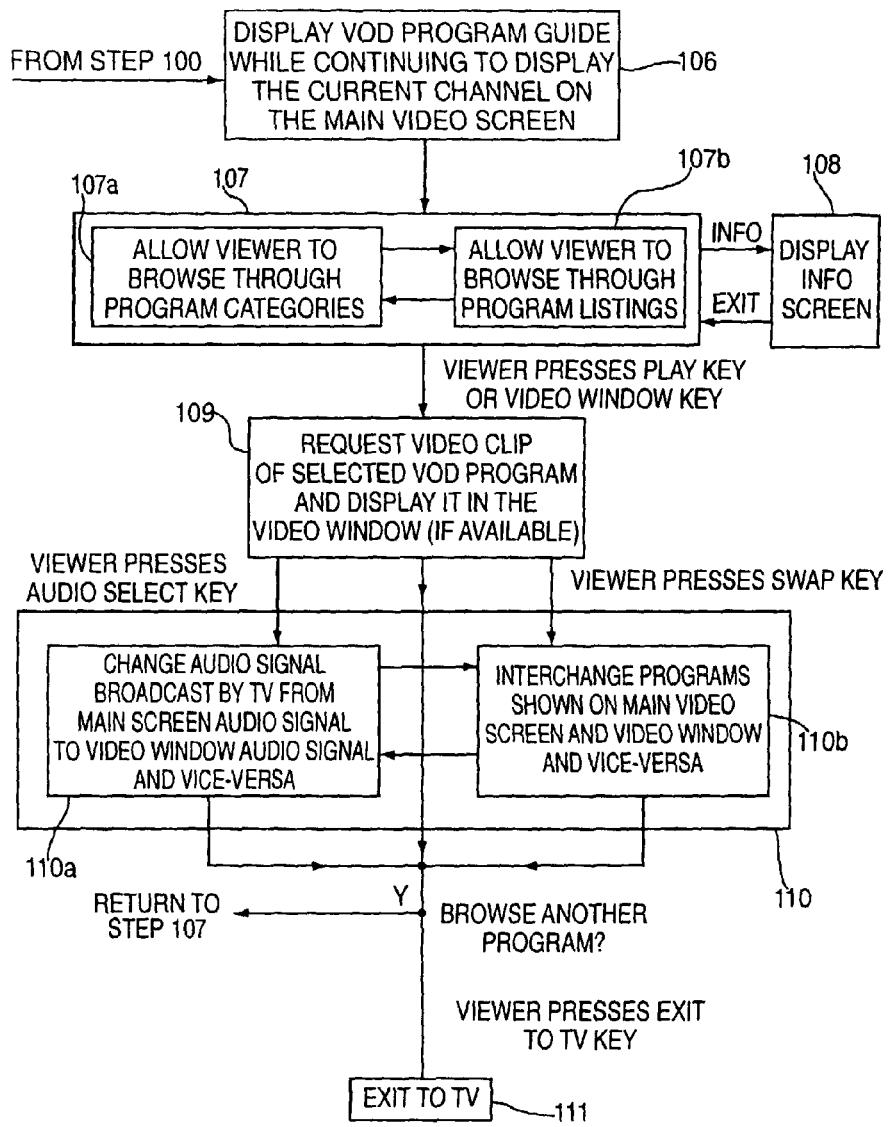

Some of the steps involved in providing the browsing display features described herein are illustrated in the flow charts of FIGS. 10-12. At step 100, the program guide provides the viewer with an option for invoking either the VOD browsing mode or the normal browsing mode. If the viewer chooses to invoke the normal browsing mode, the program guide displays program guide display 70 on viewer television equipment 40 at step 101, preferably displaying a program listing reflecting the current channel. If the viewer chooses to invoke the VOD browsing mode, VOD program guide display 90 is displayed on the television at step 106 (see flow chart in FIG. 12).

Assuming the normal browsing mode is chosen, the viewer may set time interval 73 to a time period of interest at step 102a. The viewer may scroll through available program listings in that time period using cursor and numeric keys without changing the program displayed on main display screen 72 at step 102b. Alternatively, the viewer could first scroll through the program listings at step 102b and then adjust time interval 73 at step 102a.

When a program of interest is found, the viewer may activate program guide video window 80 to watch video of that program by pressing a key such as video window key 51. If the viewer is browsing through program listings in a future time slot, the program guide may automatically request a video clip of a particular program. If the requested video clip is available, it will be displayed in the program guide video window 80 at step 103a. If the viewer is browsing through program listings in the present time slot, the program guide may automatically tune program guide video window 80 to that channel, and video from that program will be displayed in program guide video window 80 at step 103b.

While at steps 103a and 103b, the viewer may browse another program by returning to step 102 (with or without program guide video window 80 still active), press audio select key 53, press swap key 57, press info key 61, press select key 62 or exit to normal television viewing mode by pressing exit to TV 59 (step 105). Pressing audio select key 53 at steps 103 or 104 causes the audio signal being broadcast by the television to switch back and forth between the program shown on main display screen 72 and the program shown in program guide video window 80 (step 104a). For example, at step 104a the television may be broadcasting the audio signal for the program currently shown in program guide video window 80. However, the viewer may switch back to the audio signal of main screen 72 at step 104a by once again pressing the audio select key.

Pressing the swap key at steps 103 or 104 causes the program shown on main display screen 72 to be interchanged with the program shown in program guide video window 80. For example, with reference to FIG. 7, the program on channel 14 is in program guide video window 80 while the program on channel 5 is on main screen 72. The viewer may switch these programs at step 104b by pressing the swap key.

Pressing the info key at steps 103 or 104 may cause more information about the selected program to be displayed, possibly on a separate detailed information screen (not shown). Pressing the select key at steps 103 or 104 may cause the program displayed in program guide video window 80 to be displayed on main display screen 72 (not shown).

After the selected program has been browsed, the viewer may return to step 102 (with or without program guide video window 80 still active), and browse other programs, or exit to normal television viewing by pressing exit to television key 59 (step 105).

As shown in the flow chart of FIG. 12, if the viewer chooses to invoke VOD browsing mode at step 100, VOD program guide display 90 (FIGS. 8 and 9) is displayed on the main video screen at step 106. When VOD program guide display 90 is initially displayed, it may be set to a "default" category and program listing. At step 107a, the viewer may browse through the available program categories using left and right cursor keys 54d and 54c. When a category is chosen, the available programs in that category may be browsed using up and down cursor keys 54a and 54b (step 107b). However, it will be understood that the viewer could first scroll through the program listings in the default category at step 107b and then browse through the available program categories at step 107a.

When a program of interest is found, the viewer has several options. For example, the viewer may: 1) order the program by pressing select key 62 on remote 50, 2) request a video clip of that program by pressing play key 58 or video key 51 (step 109), or 3) request more information about that program by pressing info key 61 (step 108). If a VOD program has been ordered for a future time, the viewer may return to step 107 and browse other VOD programs, or exit to normal television viewing by pressing exit to television key 59. If a VOD program has been ordered for the present time, the viewer may leave browse mode and watch that program. If more information has been requested about a VOD program, any available information will be displayed in guide 90 or may appear on an additional detailed information screen (step 108). The viewer may subsequently exit the information screen and return to step 107 by once again pressing the info key 61. If a video clip of a VOD program has been requested the program guide video window will display the requested clip if it is available at step 109.

While at step 109, the viewer may browse another program by returning to step 107, press the audio select key, press the swap key, press the info key or order the program. Pressing audio select key 53 at steps 109 or 110 causes the audio signal being broadcast by the television to switch back and forth between the program shown on main display screen 72 and the video clip shown in program guide video window 80. For example, at step 110 the television may be broadcasting the audio signal for a VOD video clip currently being shown in program guide video window 80. The viewer may switch back to the audio signal of the regular program shown on main screen 72 at step 110b by once again pressing the audio select key.

Pressing the swap key at steps 110 or 109 causes the program shown on main display screen 72 to be interchanged with the program shown in program guide video window 80. For example, with reference to FIG. 9, the program on channel 5 is in program guide video window 80 while the video clip for the Bullworth program is on main screen 72. The viewer may switch these programs at step 110 by pressing the swap key. Pressing the info key at steps 109 or 110 may cause more information about the selected program to be displayed, possibly on a separate detailed information screen (not shown). After the viewer has finished browsing a selected program, he or she may return to step 107 and browse other VOD programs, order the program by pressing the select key 62, or exit to normal television viewing by pressing exit to television key 59. In addition, program guide video window 80 may be automatically deactivated after the video clip is shown.

Although not specifically shown in the flow charts of FIGS. 10-12, the viewer may at any time exit back to the normal television viewing by pressing the exit to TV key 59 on remote 50.

The foregoing is merely illustrative of the principles of this invention and various modifications can be made by those skilled in the art without departing from the scope and spirit of the invention.

What is claimed is:

1. A method for displaying a preview video on a display on which program listings information is displayed, the method comprising:
   simultaneously displaying:
   a video of a currently broadcasted television program in a first reduced size video window defined by a first reduced perimeter;
   program listings information; and
   a video clip of a future television program in a second reduced size video window defined by a second reduced perimeter, wherein the video clip is selected responsive to a user's input selecting the future program from the program listings information;

receiving a user indication to interchange the video clip of a future television program and the video of the currently broadcasted television program such that the video clip is displayed in the first reduced size video window and the video of the currently broadcasted television program is displayed in the second reduced size window; and interchanging the video clip with the video of the currently broadcasted television program in response to receiving the user indication.

2. The method of claim 1 wherein the program listings information corresponds to the currently broadcasted television program.

3. The method of claim 1 wherein the program listings information corresponds to a program other than the currently broadcasted television program.

4. The method of claim 1 wherein the program listings information comprises program listings information for a video-on-demand program.

5. The method of claim 1 wherein the program listings information comprises at least one title of a program.

6. The method of claim 1 wherein the program listings information comprises at least one program description.

7. The method of claim 1 wherein the first reduced size video window and the second reduced size video window have different sizes.

8. The method of claim 1 further comprising:
receiving a user indication to select one of the video clip and the currently broadcasted television program as a source of an audio signal of user equipment; and
selecting the one of the video clip and the currently broadcasted television program as the source of the audio signal of the user equipment in response to receiving the user indication.

9. The method of claim 1, wherein the program listings information comprises a listing for a plurality of television programs.

10. The method of claim 9, further comprising:
receiving a user selection of the listing for one of the plurality of television programs; and
displaying in the second video window a video clip that is related to the television program of the selected listing in response to receiving the user selection.

11. The method of claim 1, further Comprising automatically deactivating the second reduced size video window when the video clip has ended.

12. A system for displaying a preview video on a display on which program listings information is displayed, the system comprising:
means for simultaneously displaying:
a video of a currently broadcasted television program in a first reduced size video window defined by a first reduced perimeter;
program listings information; and
a video clip of a future television program in a second reduced size video window defined by a second reduced perimeter, wherein the video clip is selected responsive to a user's input selecting the future program from the program listings information;
means for receiving a user indication to interchange the video clip of a future television program and the video of the currently broadcasted television program such that the video clip is displayed in the first reduced size video window and the video of the currently broadcasted television program is displayed in the second reduced size window; and
means for interchanging the video clip with the video of the currently broadcasted television program in response to receiving the user indication.

13. The system of claim 12 wherein the program listings information corresponds to the currently broadcasted television program.

14. The system of claim 12 wherein the program listings information corresponds to a program other than the currently broadcasted television program.

15. The system of claim 12 wherein the program listings information comprises program listings information for a video-on-demand program.

16. The system of claim 12 wherein the program listings information comprises at least one title of a program.

17. The system of claim 12 wherein the program listings information comprises at least one program description.

18. The system of claim 12 wherein the first reduced size video window and the second reduced size video window have different sizes.

19. The system of claim 12 further comprising:
means for receiving a user indication to select one of the video clip and the currently broadcasted television program as a source of an audio signal of user equipment; and
means for selecting the one of the video clip and the currently broadcasted television program as the source of the audio signal of the user equipment in response to receiving the user indication.

20. A system for displaying a preview video on a display on which program listings information is displayed, the system comprising:
a display device; and
control circuitry configured to direct the display device to simultaneously display:
a video of a currently broadcasted television program in a first reduced size video window defined by a first reduced perimeter;
program listings information; and
a video clip of a future television program in a second reduced size video window defined by a second reduced perimeter, wherein the video clip is selected responsive to a user's input selecting the future program from the program listings information;
a user input device for receiving a user indication to interchange the video clip of a future television program and the video of the currently broadcasted television program such that the video clip is displayed in the first reduced size video window and the video of the currently broadcasted television program is displayed in the second reduced size window, wherein the control circuitry is further configured to direct the display device to interchange, in response to the user input device receiving the user indication, the video clip with the video of the currently broadcasted program.

21. The system of claim 20 wherein the program listings information corresponds to the currently broadcasted television program.

22. The system of claim 20 wherein the program listings information corresponds to a program other than the currently broadcasted television program.

23. The system of claim 20 wherein the program listings information comprises program listings information for a video-on-demand program.

24. The system of claim 20 wherein the program listings information comprises at least one title of a program.

25. The system of claim 20 wherein the program listings information comprises at least one program description.

26. The system of claim 20 wherein the first reduced size video window and the second reduced size video window have different sizes.

27. The system of claim 20 further comprising:
a user input device for receiving a user indication to select one of the video clip and the currently broadcasted television program as a source of an audio signal of user equipment, wherein
the control circuitry is further configured to select, in response to the user input device receiving the user indication, the one of the video clip and the currently broadcasted television program as the source of the audio signal of the user equipment.

28. Data storage medium for a system that displays video on a display on which program listings information is displayed, the data storage medium having program logic recorded thereon for:
simultaneously displaying:
a video of a currently broadcasted television program in a first reduced size video window defined by a first reduced perimeter;
program listings information; and
a video clip of a future television program in a second reduced size video window defined by a second reduced perimeter, wherein the video clip is selected responsive to a user's input selecting the future program from the program listings information;
receiving a user indication to interchange the video clip of a future television program and the video of the currently broadcasted television program such that the video clip is displayed in the first reduced size video window and the video of the currently broadcasted television program is displayed in the second reduced size window; and
interchanging the video clip with the video of the currently broadcasted television program in response to receiving the user indication.

29. The data storage medium of claim 28 wherein the program listings information corresponds to the currently broadcasted television program.

30. The data storage medium of claim 28 wherein the program listings information corresponds to a program other than the currently broadcasted television program.

31. The data storage medium of claim 28 wherein the program listings information comprises program listings information for a video-on-demand program.

32. The data storage medium of claim 28 wherein the program listings information comprises at least one title of a program.

33. The data storage medium of claim 28 wherein the program listings information comprises at least one program description.

34. The data storage medium of claim 28 wherein the first reduced size video window and the second reduced size video window have different sizes.

35. The data storage medium of claim 28 comprising additional program logic recorded thereon for:
receiving a user indication to select one of the video clip and the currently broadcasted television program as a source of an audio signal of user equipment; and
selecting the one of the video clip and the currently broadcasted television program as the source of the audio signal of the user equipment in response to receiving the user indication.

* * * * *